(12) United States Patent
Jung et al.

(10) Patent No.: US 9,691,417 B1
(45) Date of Patent: Jun. 27, 2017

(54) MAGNETORESISTIVE SENSOR HAVING A SYNTHETIC ANTIFERROMAGNETIC BOTTOM SHIELD

(71) Applicant: Seagate Technology LLC, Cupertino, CA (US)

(72) Inventors: Wonjoon Jung, Eden Prairie, MN (US); Victor Sapozhnikov, Minnetonka, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/925,586

(22) Filed: Oct. 28, 2015

Related U.S. Application Data

(63) Continuation-in-part of application No. 13/930,150, filed on Jun. 28, 2013, now Pat. No. 9,251,815.

(51) Int. Cl.
*G11B 5/39* (2006.01)

(52) U.S. Cl.
CPC ............ *G11B 5/3912* (2013.01); *G11B 5/398* (2013.01); *G11B 5/3909* (2013.01); *G11B 5/3932* (2013.01); *G11B 2005/3996* (2013.01)

(58) Field of Classification Search
None
See application file for complete search history.

(56) References Cited

U.S. PATENT DOCUMENTS

| | | | |
|---|---|---|---|
| 6,466,419 B1 * | 10/2002 | Mao | G11B 5/3903 360/319 |
| 7,606,007 B2 | 10/2009 | Gill | |
| 7,706,108 B2 | 4/2010 | Gill | |
| 7,910,159 B2 | 3/2011 | Jung | |
| 7,961,438 B2 | 6/2011 | Mizuno et al. | |
| 7,974,048 B2 | 7/2011 | Shimazawa et al. | |
| 8,049,997 B2 | 11/2011 | Miyauchi et al. | |
| 8,189,303 B2 | 5/2012 | Hara et al. | |
| 8,305,715 B2 | 11/2012 | Mauri et al. | |
| 8,630,068 B1 | 1/2014 | Mauri et al. | |
| 2001/0038927 A1 * | 11/2001 | Hasewaga | G11B 5/3903 428/811 |

(Continued)

FOREIGN PATENT DOCUMENTS

| | | |
|---|---|---|
| JP | 2010-086648 A | 4/2010 |
| JP | 2012-533141 A | 12/2012 |
| WO | 2011/005914 A1 | 1/2011 |

OTHER PUBLICATIONS

Prosecution from U.S. Appl. No. 13/930,150, filed Jun. 28, 2013, including Non-Final Rejection issued on Oct. 5, 2015; Advisory Action issued on Sep. 3, 2015; Final Rejection issued on Jul. 24, 2015; Non-Final Rejection issued on Jan. 9, 2015; and Restriction Requirement issued on Oct. 9, 2014; 38 total pages.

*Primary Examiner* — Craig A. Renner
(74) *Attorney, Agent, or Firm* — Westman, Champlin & Koehler, P.A.

(57) ABSTRACT

A reader includes a bearing surface, a sensor stack and a bottom shield below the sensor stack. The bottom shield has a synthetic antiferromagnetic (SAF) structure that includes a first magnetic layer that has a first width at the bearing surface and a second magnetic layer that has a second width at the bearing surface. The second width is less than the first width. The second magnetic layer has a magnetic orientation with at least a component that is substantially orthogonal to the bearing surface.

15 Claims, 22 Drawing Sheets

(56) References Cited

U.S. PATENT DOCUMENTS

| | | |
|---|---|---|
| 2004/0008455 A1* | 1/2004 | Hasegawa et al. .. G11B 5/3932 360/324.12 |
| 2004/0120082 A1* | 6/2004 | Ikegami et al. ..... G11B 5/3909 360/324.11 |
| 2004/0207962 A1 | 10/2004 | Saito et al. |
| 2005/0013061 A1* | 1/2005 | Gill ........................ G11B 5/127 360/324.11 |
| 2005/0024785 A1* | 2/2005 | Gill et al. ............ G11B 5/3912 360/324.12 |
| 2005/0264950 A1 | 12/2005 | Gill |
| 2006/0158792 A1* | 7/2006 | Gill ..................... G11B 5/3912 360/324.11 |
| 2009/0168256 A1 | 7/2009 | Mauri et al. |
| 2009/0279213 A1 | 11/2009 | Wu et al. |
| 2010/0027168 A1 | 2/2010 | Chou et al. |
| 2010/0039734 A1 | 2/2010 | Hara et al. |
| 2010/0067148 A1 | 3/2010 | Tsuchiya et al. |
| 2010/0149689 A1 | 6/2010 | Tsuchiya et al. |
| 2011/0051291 A1 | 3/2011 | Miyauchi et al. |
| 2011/0232079 A1 | 9/2011 | Miyauchi et al. |
| 2011/0279923 A1 | 11/2011 | Miyauchi et al. |
| 2012/0063035 A1 | 3/2012 | Childress et al. |
| 2012/0087045 A1 | 4/2012 | Yanagisawa et al. |
| 2012/0147504 A1 | 6/2012 | Zhou et al. |
| 2012/0250189 A1 | 10/2012 | Degawa et al. |
| 2012/0327537 A1 | 12/2012 | Singleton et al. |
| 2015/0002962 A1 | 1/2015 | Singleton et al. |
| 2015/0213815 A1 | 7/2015 | Sapozhnikov et al. |

* cited by examiner

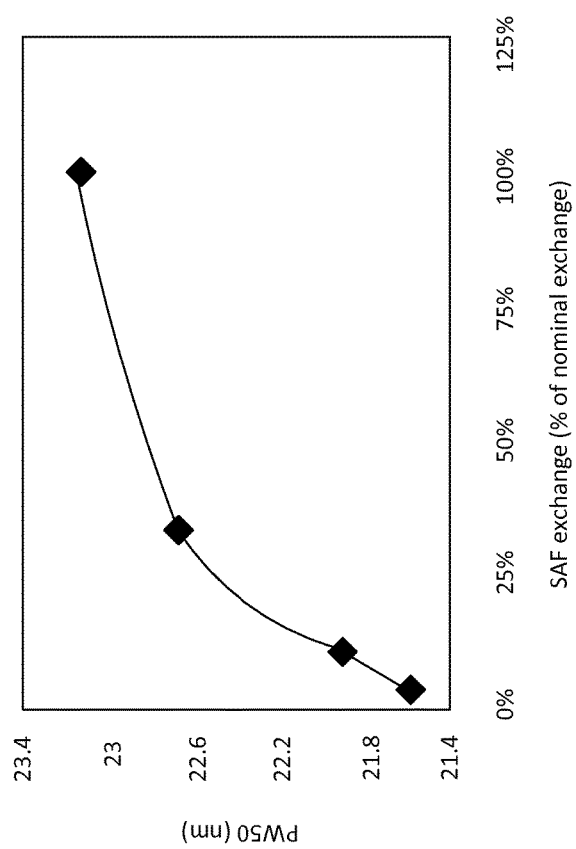
FIG. 9

MAGNETORESISTIVE SENSOR HAVING A SYNTHETIC ANTIFERROMAGNETIC BOTTOM SHIELD

CROSS-REFERENCE TO RELATED APPLICATION

The present application is a continuation-in-part of and claims priority of U.S. patent application Ser. No. 13/930,150, filed Jun. 28, 2013, the content of which is hereby incorporated by reference in its entirety.

BACKGROUND

In a magnetic data storage and retrieval system, a magnetic read/write head includes a reader portion having a magnetoresistive (MR) sensor for retrieving magnetically encoded information stored on a magnetic disc. Magnetic flux from the surface of the disc causes rotation of the magnetization vector of a sensing layer of the MR sensor, which in turn causes a change in electrical resistivity of the MR sensor. The change in resistivity of the MR sensor can be detected by passing a current through the MR sensor and measuring a voltage across the MR sensor. External circuitry then converts the voltage information into an appropriate format and manipulates that information to recover the information encoded on the disc.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and embodiments as further illustrated in the accompanying drawings and defined in the appended claims.

A reader disclosed herein includes a bearing surface (for example, an air-bearing surface (ABS)), a sensor stack and a bottom shield below the sensor stack. The bottom shield has a synthetic antiferromagnetic (SAF) structure that includes a first magnetic layer that has a first width at the bearing surface and a second magnetic layer that has a second width at the bearing surface. The second width is less than the first width. The second magnetic layer has a magnetic orientation with at least a component that is substantially orthogonal to the bearing surface. These and various other features and advantages will be apparent from a reading of the following detailed description.

BRIEF DESCRIPTIONS OF THE DRAWINGS

FIG. 9 illustrates a graph of an alternative relationship between PW50 performance of an example MR sensor and a parameter of the MR sensor.

DETAILED DESCRIPTION

Figure 1:
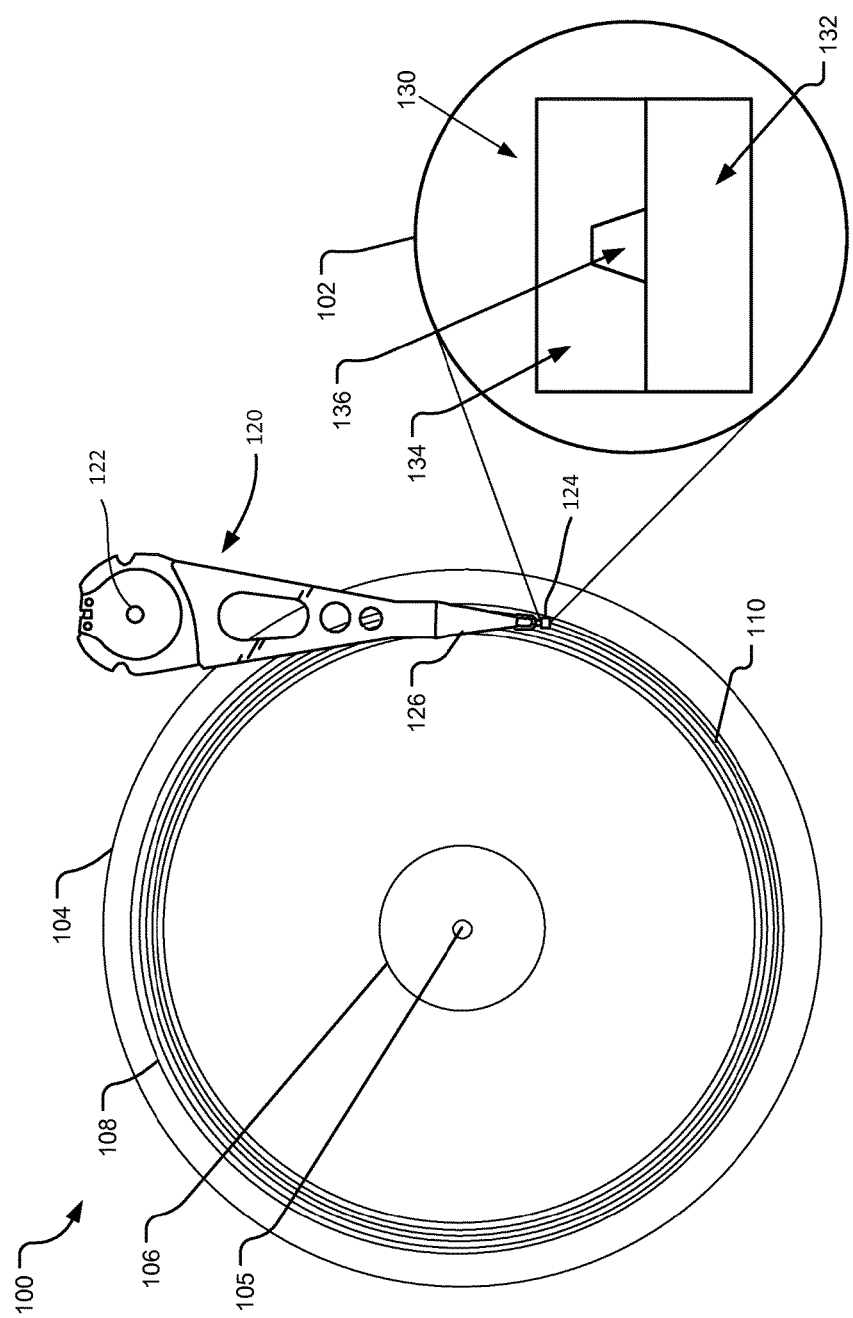
FIG. 1 illustrates a data storage device having an example MR sensor.

There is an increasing demand for high data densities and sensitive sensors to read data from a magnetic media. Giant Magnetoresistive (GMR) sensors that have increased sensitivity consist of two ferromagnetic layers separated by a thin conductive, non-magnetic spacer layer such as copper. In Tunnel Magnetoresistive (TMR) sensors the electrons travel in the direction perpendicular to the layers across a thin insulating barrier. An AFM material is placed adjacent to the first magnetic layer (called pinned layer (PL)) to prevent it from rotation. AFM materials exhibiting this property are termed "pinning materials". The second soft layer rotates freely in response to an external field and is called the "free layer (FL)".

To operate the MR sensor properly, the sensor should be stabilized against the formation of edge domains because domain wall motion results in electrical noise that makes data recovery difficult. A common way to achieve stabilization is with a permanent magnet abutted junction design. In this scheme, permanent magnets with high coercive field (i.e., hard magnets) are placed at each end of the sensor. The field from the permanent magnets stabilizes the sensor and prevents edge domain formation, as well as provides proper bias. The sensor further includes a reference layer (RL) and a PL, which together form a synthetic AFM (SAF) structure and an AFM layer. Stabilization by an AFM layer allows for consistent and predictable orientation of the SAF structure. Furthermore, this also provides stable structure to enable high amplitude linear response for a reader using the MR sensor.

However, using the AFM stabilized structure increases the shield-to-shield spacing (SSS) of the reader. PW50 of a magnetic sensor (its pulse width at half-height of the pulse) determines the signal-to-noise ratio (SNR) in a recording system. Because PW50 improves with SSS reduction, achieving lower SSS leads to lower PW50 and, as a result, increased SNR. An example of the relationship between the PW50 and SSS, as suggested by both modeling and experiments can be given as follows:

$$\Delta PW50 \approx 0.3 * \Delta SSS$$

Thus, a reduction in the SSS leads to reduction in the value of the PW50 and therefore, an increase in the value of the SNR for the recording system. Thus, higher linear density of the reader can be achieved by reducing the SSS. Furthermore, smaller SSS also improves the cross-track resolution of the reader and such gain in cross-track resolution contributes to further improvement of the areal density that can be achieved by the reader.

An MR sensor disclosed herein reduces the SSS by removing the AFM layer from the sensor stack and using a bottom shield layer with an AFM layer and a bottom shield pinned layer. The pinned layer of the bottom shield and a pinned layer of the sensor stack are stabilized using the AFM layer in the bottom shield. In one implementation, the bottom shield is made of the SAF structure, with the top layer of the said structure in proximity to the sensor stack.

FIG. 1 illustrates a data storage device 100 having an example MR sensor, shown in more detail in an exploded view 102. Although other implementations are contemplated, in the illustrated implementation, the data storage device 100 includes a storage medium 104 (e.g., a magnetic data storage disc) on which data bits can be recorded using a magnetic write pole and from which data bits can be read using a magnetoresistive element. The storage medium 104 rotates about a spindle center or a disc axis of rotation 105 during rotation, and includes an inner diameter 106 and an outer diameter 108 between which are a number of concentric data tracks 110. It should be understood that the described technology may be used with a variety of storage formats, including continuous magnetic media, discrete track (DT) media, shingled media, etc.

Information may be written to and read from data bit locations in the data tracks 110 on the storage medium 104. A transducer head assembly 124 is mounted on an actuator arm 126 of an actuator assembly 120 at an end distal to an actuator axis of rotation 122. The transducer head assembly 124 flies in close proximity above the surface of the storage medium 104 during disc rotation. The actuator assembly 120 rotates during a seek operation about the actuator axis of rotation 122. The seek operation positions the transducer head assembly 124 over a target data track for read and write operations.

The exploded view 102 schematically illustrates a bearing surface (for example, an air-bearing surface (ABS)) view of an MR sensor 130. The MR sensor 130 includes a bottom shield 132, a top shield 134, and a sensor stack 136 located between the bottom shield 132 and the top shield 134 along a down-track direction. In one implementation, the bottom shield 132 is an AFM stabilized bottom shield. Such an AFM stabilized bottom shield 132 provides shielding function and also provides stabilization of the sensor stack 136. The sensor stack 136 may include a first layer in proximity to the bottom shield, a metallic coupling layer (e.g., ruthenium), a reference layer, a barrier or spacer layer, a free layer and a capping layer (the detailed structure of the sensor stack 136 is not shown in FIG. 1). The first layer of the sensor stack 136 is also referred to as the first pinned layer herein. The magnetization of the first pinned layer is supported by the AFM stabilized bottom shield. The magnetization of the first pinned layer is partially pinned in that the magnetization of the first pinned layer may move somewhat in response to external magnetic fields. In other words, the magnetization of the first pinned layer is not rigidly pinned.

The first pinned layer of the sensor stack 136 is magnetically coupled to the AFM stabilized bottom shield 132. For example, the AFM stabilized bottom shield 132 may include a pinned layer that is pinned using an AFM layer (not shown in FIG. 1). In one implementation, the orientation of magnetization of the first pinned layer of the sensor stack 136 includes a component orthogonal to the ABS of the MR sensor 130 because the pinning direction of the AFM stabilized bottom shield 132 also includes a component orthogonal to an ABS of the MR sensor 130.

Furthermore, the AFM stabilized bottom shield 132 may also include a second magnetic layer (not shown) antiferromagnetic ally coupled to the said bottom shield pinned layer forming a SAF structure in the AFM stabilized bottom shield 132. In such an implementation, the first pinned layer of the sensor stack 136 is magnetically coupled to this second magnetic layer of the AFM stabilized bottom shield 132. For example, in one implementation, the angle between the pinning direction of the pinned layer of the AFM stabilized bottom shield and the ABS of the MR sensor may be between 30 degrees and 150 degrees.

The top shield 134 may also comprise side shields (not shown) located on two sides of the sensor stack 136 in a cross-track direction. In an alternative implementation, permanent magnets (not shown) are provided on the two sides of the sensor stack 136 in the cross-track direction.

In one implementation, the formation of the sensor stack 136 and the formation of the AFM stabilized bottom shield 132 are carried out during different stages of a process forming a wafer including the sensor stack 136 and the AFM stabilized bottom shield 132, wherein, the sensor stack 136 is grown directly on top of the AFM stabilized bottom shield 132. Alternatively, the first pinned layer of the sensor stack 136 and the AFM stabilized bottom shield 132 may be separated by non-magnetic layer, wherein the non-magnetic layer provides indirect magnetic coupling between the top magnetic layer of the AFM stabilized bottom shield 132 and the first magnetic layer of the sensor stack 136.

The implementations of the MR sensor 130 with the AFM stabilized bottom shield reduces the SSS and provides better shielding. As a result, the resolution of the MR sensor 130 is improved while the stability of the MR sensor 130 is maintained. Including the AFM layer into the AFM stabilized bottom shield 132 allows for removing the AFM layer from the sensor stack 136. As the AFM layer in the AFM stabilized bottom shield 132 is not part of the sensor stack 136, the SSS for the sensor stack 136 is reduced, resulting in improved PW50. Furthermore, including the SAF structure in the AFM stabilized bottom shield 132 also allows increasing the stability of the MR sensor 130.

Figure 2:
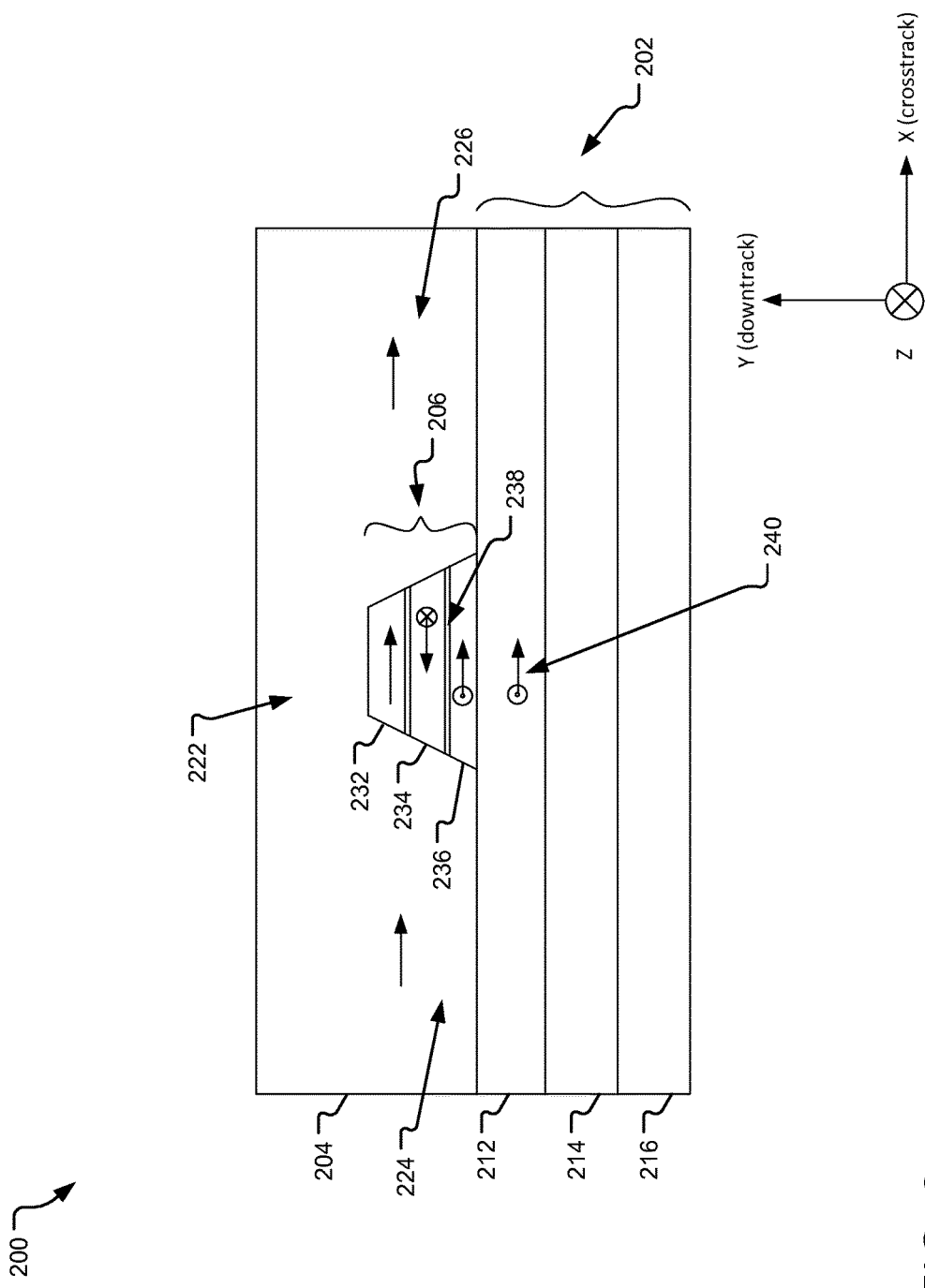
FIG. 2 illustrates an ABS view of an implementation of an MR sensor.

FIG. 2 illustrates an ABS view of an implementation of an MR sensor 200. The MR sensor 200 includes a bottom shield 202 and a top shield 204 on two opposite sides (along down-track direction) of a sensor stack 206. The bottom shield 202 includes a pinned layer 212 in proximity to the sensor stack 206, an AFM layer 214, and a seed layer 216. A bulk magnetic shield (not shown) may also be provided underneath the seed layer 216. In one implementation, the pinned layer 212 is stabilized using the AFM layer 214. The pinned layer 212 may be pinned by the presence of the AFM layer 214 with a magnetic orientation set during post deposition anneal process. In one implementation, the pinning direction of the pinned layer 212 is orthogonal (in the z direction) to the ABS of the MR sensor 200. However, at the ABS plane, the direction of magnetization of the pinned layer 212 includes a component that is parallel to the ABS of the sensor 200. This is illustrated in FIG. 2 using a vector 240 that includes an orthogonal component (in the z direction) and a parallel component (in the x direction). Similar vector notations are also used to denote the magnetization directions in the reference layer 234 and the pinned layer 236 of the sensor stack 206 at the ABS plane. In one implementation, the top shield 204 may comprise a top shield layer 222 and side shield layers 224 and 226. The side shields 224 and 226 are located on the two sides of the sensor stack 206 in the cross-track direction and they may be used to bias the magnetic orientation of a free layer of the sensor stack 206.

An implementation of the sensor stack 206 includes a pinned layer 236, a reference layer 234, and a cap and free layer structure 232. The pinned layer 236 and the reference layer 234 are separated from each other by a metallic layer 238, made of, e.g., ruthenium (Ru). In the illustrated implementation of the MR sensor 200, the magnetic orientation of the pinned layer 236 is pinned, to a certain extent, by the AFM layer 214 of the bottom shield 202. Because the magnetization orientation of the pinned layer 212 includes a component orthogonal to the ABS of the MR sensor 200, the magnetization orientation of the pinned layer 236 also includes a component orthogonal to the ABS of the MR sensor 200. In effect the AFM layer 214 is used to stabilize each of the pinned layer 212 of the bottom shield and the pinned layer 236 of the sensor stack. Thus, in effect, the pinned layer 236 of the sensor stack 206 is magnetically coupled to the bottom shield 202.

Such stabilizing of the pinned layer 236 of the sensor stack 206 by the AFM layer 214 of the bottom shield 202 removes the need for an AFM layer in the sensor stack, thus reducing the down-track width of the sensor stack. As a result, the effective SSS between the top shield layer 222 and the bottom shield 202 is reduced, effectively providing improved PW50 performance for the MR sensor 200. However, decreasing the SSS of can reduce stability of the MR sensor 200. For instance, an MR sensor with lower SSS is more likely to be affected by writer-induced stray field or exterior stray field, decreasing SNR of signal read from a magnetic media. To address such concerns of decreased stability an implementation of an MR sensor disclosed herein provides for an SAF structure in the bottom shield.

Figure 3:
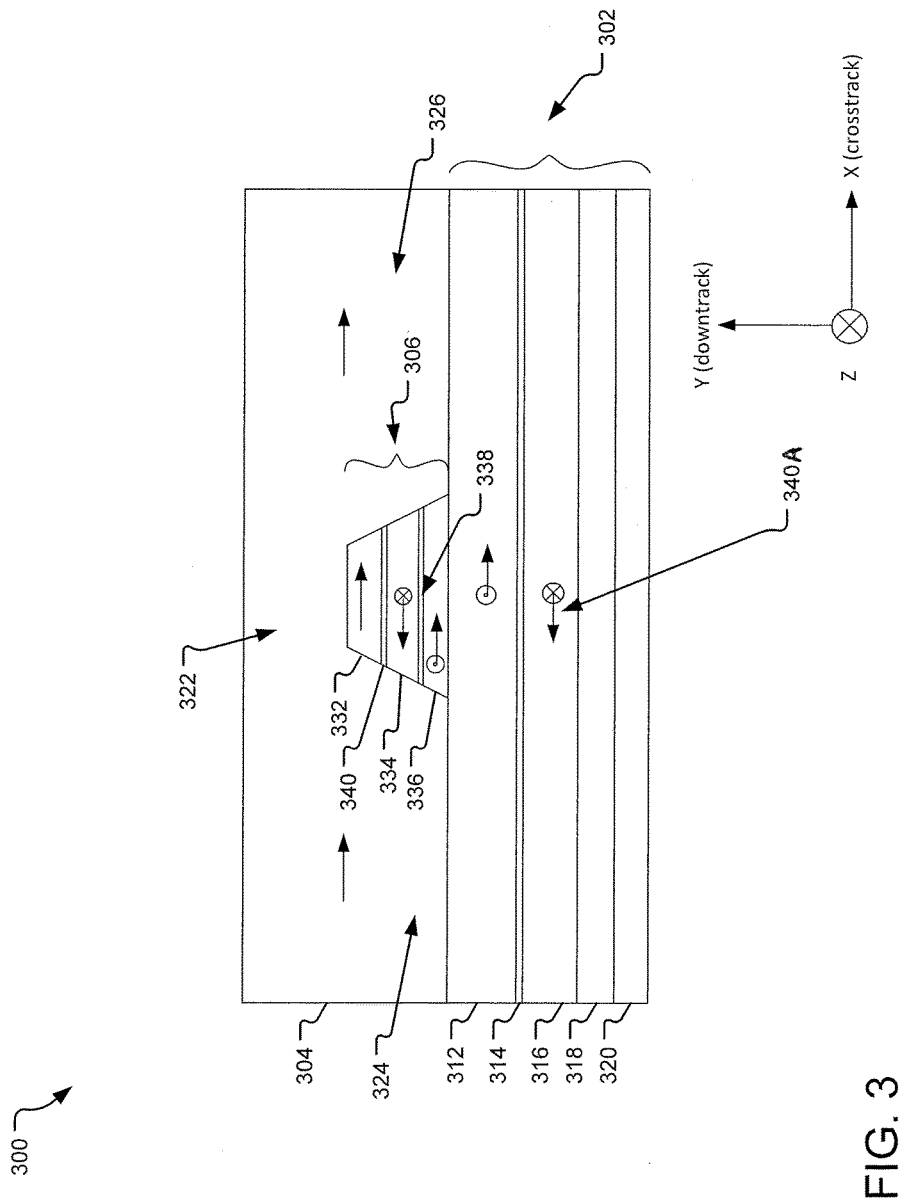
FIG. 3 illustrates an ABS view of an alternative implementation of an MR sensor.

FIG. 3 illustrates an ABS view of such an implementation of an MR sensor 300. Specifically, the MR sensor 300 includes a bottom shield 302 and a top shield 304 on two opposite sides (along down-track direction) of a sensor stack 306. The bottom shield 302 includes an SAF structure including a top layer (RL) 312 in proximity to the sensor stack 306, a thin non-magnetic layer 314, a pinned layer 316, an AFM layer 318, and a seed layer 320. In one implementation, the pinned layer 316 is stabilized using the AFM layer 318. The orientation of pinning of the layer 316 has a component orthogonal (in the z direction) to the ABS of the MR sensor 300. However, in any case, at the ABS plane, the direction of magnetization of the pinned layer 316 has a component that is parallel to the ABS of the sensor 316. This is illustrated in FIG. 3 using a vector 340A that includes an orthogonal component (in the z direction) and a parallel component (in the negative x direction). Similar vector notations are also used to denote the "magnetization orientations in the reference layer 312, the pinned layer 336 of the sensor stack 306, and the reference layer 334 of the sensor stack 306.

The pinned layer 316 and the reference layer 312 are antiferromagnetically coupled through a non-magnetic layer 314 (such as ruthenium) via Ruderman-Kittel-Kasuya-Yosida (RKKY) exchange interaction. Such an SAF structure reduces the effect of demagnetizing fields, thus improving the stability provided by the bottom shield 302. The widths of the pinned layer 316 and the reference layer 312 are selected such that the benefits of providing the shielding function of the bottom shield 302 are preserved.

The top shield 304 may comprise a top shield layer 322 and side shield layers 324 and 326. The side shields 324 and 326 are located on the two sides of the sensor stack 306 in cross-track direction and they may be used to bias the magnetic orientation of a free layer of the sensor stack 306.

An implementation of the sensor stack 306 includes a pinned layer 336, a reference layer 334, and a cap and free layer 332, and a barrier layer 340. The pinned layer 336 and the reference layer 334 are separated from each other by a metallic layer 338, made of, e.g., ruthenium (Ru). In the illustrated implementation of the MR sensor 300, the pinned layer 336 is pinned by the AFM layer 318 of the bottom shield 302. For example, the pinning orientation of the pinned layer 336 includes a component orthogonal to the ABS of the MR sensor 300. Thus, the pinning of each of the pinned layer 316 and the pinned layer 336 includes a component that is orthogonal to the ABS of the MR sensor 300. In effect the AFM layer 318 is used to stabilize each of the pinned layer 336 of the sensor stack 306 and the pinned layer 316 of the bottom shield 302. Thus, in effect, the pinned layer 336 of the sensor stack 306 is magnetically coupled to the bottom shield 302.

As the AFM layer 318, the SAF reference layer 312, and the SAF pinned layer 316 do not contribute to the SSS, the AFM Layer 318 in the bottom shield 302 may be made thicker than an AFM layer in a prior art sensor stack having an AFM layer therein. As the bottom shield 302 is fabricated before the sensor stack 306, the bottom shield 302 can be annealed at higher temperature to improve AFM dispersion and stability. Also, the detrimental effect of an AFM grain flipping in the bottom shield 302 is strongly diminished compared to the effect of an AFM grain flipping in the sensor stack 306 as magnetic layers of bottom shield 302 are substantially thicker than SAF layers in the sensor stack 306. As a result, any disturbance of ferromagnetic layer magnetization originating at the interface with the AFM layer 318 gets effectively suppressed throughout the thickness of bottom shield 302, specifically through the thickness of the SAF layers 312 and 316, and does not propagate to distort a sensor read-back signal. Furthermore, providing a bottom shield that includes an SAF structure increases the stability of the MR sensor 300 in the presence of stray fields compared to MR sensors having bottom shield without an SAF structure. Furthermore, the introduction of the AFM layer in the bottom shield and removal of an AFM layer from the sensor stack also improves the smoothness of the sensor stack. As a result, lower resistance MR sensors capable of higher level data transfer are possible.

FIG. 3 illustrates that the magnetization of the RL 312 of the SAF structure in the bottom shield is opposite the magnetization of the PL 316 of the SAF structure in the bottom shield. On the other hand, the magnetization of the PL 336 of the sensor stack is parallel to the magnetization of the RL 312. The magnetization of the RL 334 of the sensor stack is opposite the magnetization of the PL 336 of the sensor stack. The FL 332 of the sensor stack is biased by the side shields 324 and 326 to have magnetization parallel to the ABS. Note that the direction of magnetization of various layers as illustrated in FIG. 3 are in the vicinity of the ABS of the sensor. Specifically, in the vicinity of the ABS, the magnetizations of the various layers have a component that is parallel to the ABS (see FIG. 6 below).

In one implementation of the MR sensor 300, the thickness of the SAF reference layer 312 and the SAF pinned layer 316 is selected such that the desired stability of the MR sensor is achieved while also maintaining the improvement in the PW50. Specifically, the thicknesses of the SAF reference layer 312 and the SAF pinned layer 316 depend on the magnetic moment of the material used in the SAF reference layer 312 and the SAF pinned layer 316. For example, for a permalloy type of material, the thicknesses of the SAF reference layer 312 and the SAF pinned layer 316 may be approximately greater than 10 nanometers (nm). In an implementation, each of the magnetic layers in the bottom shield 302 may have a thickness in the range of between 5 nm-40 nm.

Figure 4:
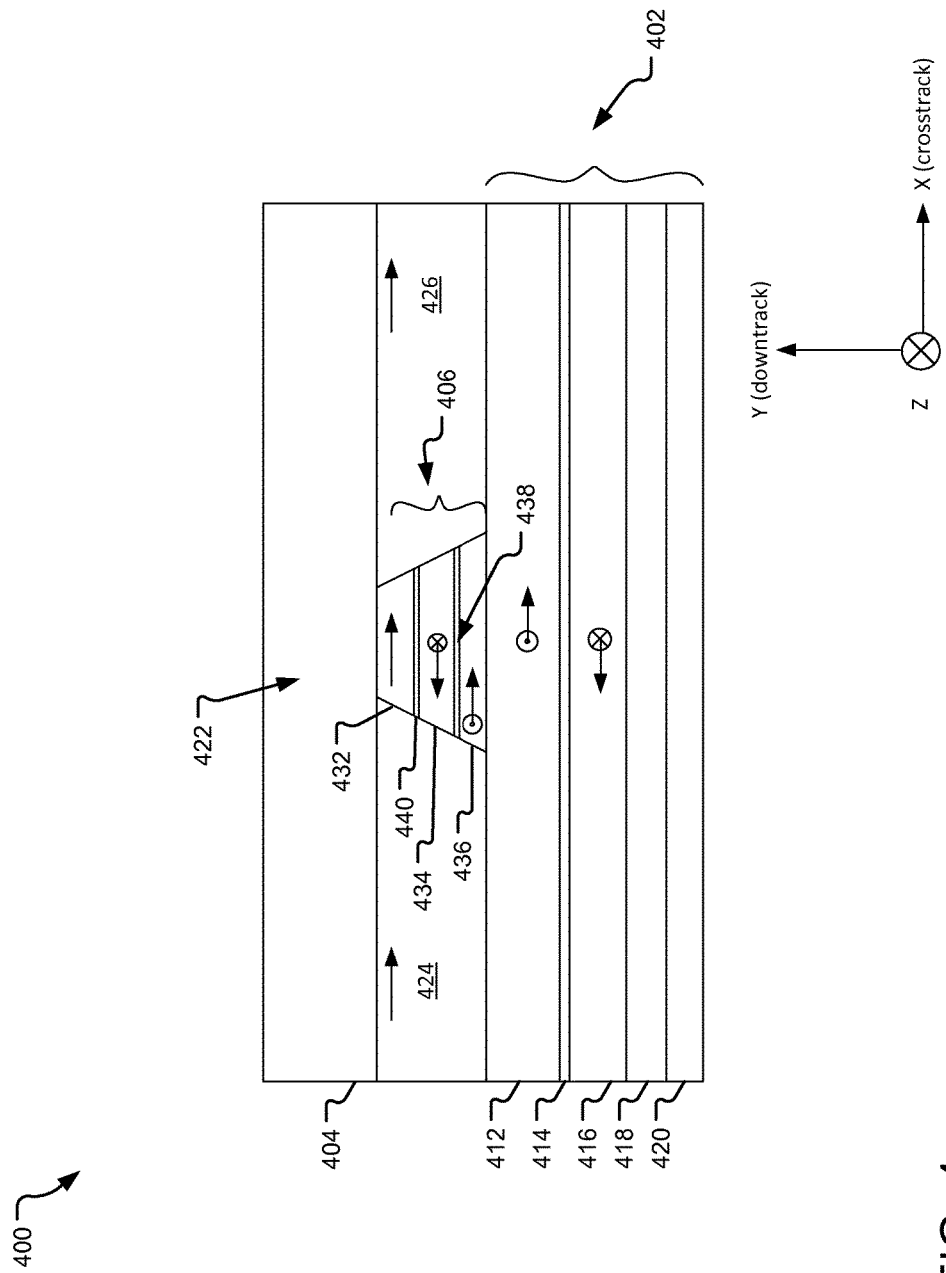
FIG. 4 illustrates an ABS view of yet another implementation of an MR sensor.

FIG. 4 illustrates an ABS view of an alternative implementation of an MR sensor 400. Specifically, the MR sensor 400 includes a bottom shield 402 and a top shield 404 on two opposite sides (along a down-track direction) of a sensor stack 406. The top shield 404 includes a top shield layer 422. The bottom shield 402 includes an SAF structure including a top layer (RL) 412 in proximity to the sensor stack 406, a thin non-magnetic layer 414, a pinned layer 416, an AFM layer 418, and a seed layer 420. An implementation of the sensor stack 406 includes a pinned layer 436, a reference layer 434, a cap and free layer 432, and a barrier layer 440. The pinned layer 436 and the reference layer 434 are separated from each other by a metallic layer 438, made of, e.g., ruthenium (Ru). Each of the various components of the bottom shield 402 and the sensor stack 406 are substantially similar to the related elements of the bottom shield 302 and the sensor stack 306 of the MR sensor 300. The MR sensor 400 is different from the MR sensor 300 disclosed in FIG. 3 in that while the MR sensor 300 employs side shields 324 and 326 to bias a free layer of the sensor stack 306, the MR sensor 400 employs permanent magnets 424 and 426 to bias a free layer of the sensor stack 406.

Figure 5:
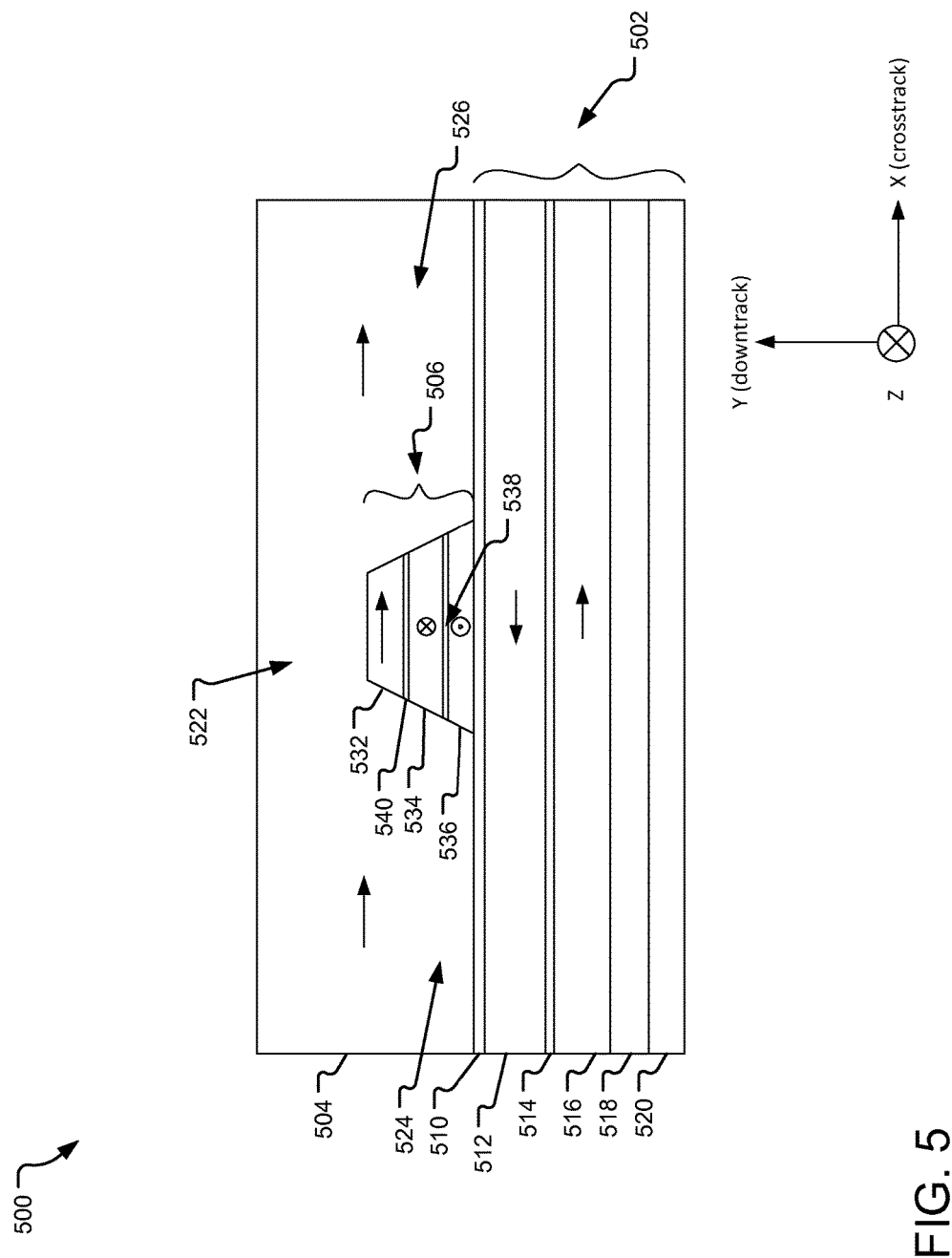
FIG. 5 illustrates an ABS view of an alternative implementation of an MR sensor.

FIG. 5 illustrates an ABS view of an alternative implementation of an MR sensor 500. Specifically, the MR sensor 500 includes a bottom shield 502 and a top shield 504 on two opposite sides (along a down-track direction) of a sensor stack 506. The bottom shield 502 includes an SAF structure including a top layer (RL) 512 in proximity to the sensor stack 506, a thin non-magnetic layer 514, a pinned layer 516, an AFM layer 518, and a seed layer 520. The top shield 504 may comprise a top shield layer 522 and side shield layers 524 and 526. The side shields 524 and 526 are located on the two sides of the sensor stack 506 in a cross-track direction and they may be used to bias the magnetic orientation of a free layer of the sensor stack 506. An implementation of the sensor stack 506 includes a pinned layer 536, a reference layer 534, a cap and free layer 532, and a barrier layer 540. The pinned layer 536 and the reference layer 534 are separated from each other by a metallic layer 538, made of, e.g., ruthenium (Ru). Each of the various components of the top shield 504 and the sensor stack 506 are substantially similar to the related elements of the top shield 304 and the sensor stack 306 of the MR sensor 300. The MR sensor 500 is different from the MR sensor 300 disclosed in FIG. 3 in that while the bottom shield 302 of the MR sensor 300 is in direct magnetic contact with the sensor stack 306, the bottom shield 502 of the MR sensor 500 is separated from the sensor stack 506 by a non-magnetic layer 510. As a result, the pinned layer 536 of the sensor stack 506 is not stabilized by coupling the AFM stabilized bottom shield 502 directly. On the other hand, the pinned layer 536 of the sensor stack 506 is stabilized by strong non-direct orthogonal coupling between the AFM stabilized bottom shield 502 and the pinned layer 536 of the sensor stack 506 provided by the non-magnetic layer 510. In the sensor 500, the magnetic orientation of the SAF reference layer 512 may be directed along the ABS of the sensor 500 rather than having a component orthogonal to the ABS of the sensor 500. Such biasing scheme prevents MR sensor polarity flips.

Figure 6:
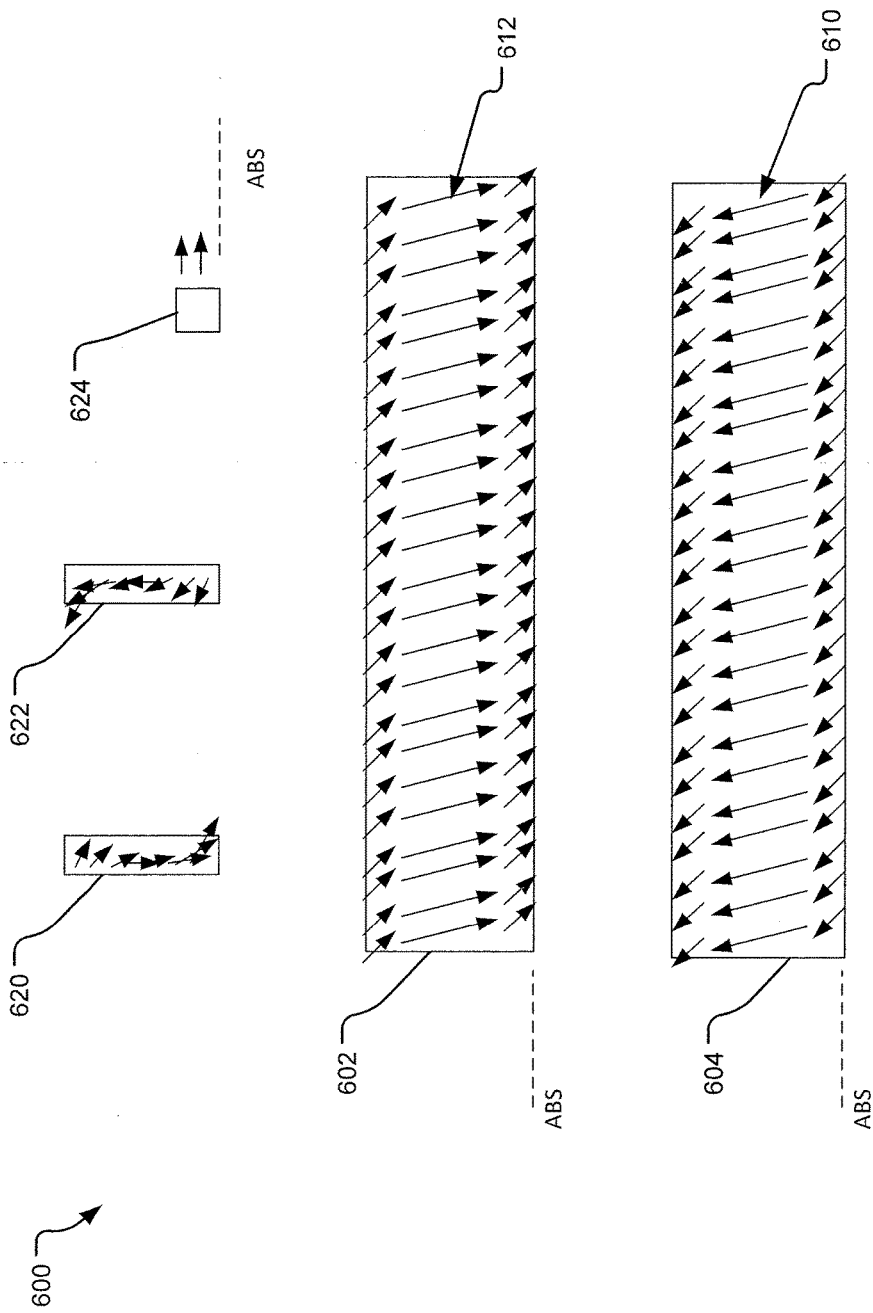
FIG. 6 illustrates a magnetization map of various magnetic layers of the MR sensor disclosed herein.

FIG. 6 illustrates a magnetization map 600 of various magnetic layers of the MR sensor disclosed herein, including a PL (pinned by an AFM layer) of an SAF structure of the bottom shield, an RL (which is antiferromagnetically coupled to the PL of the bottom shield) of the SAF structure of the bottom shield, PL of a sensor stack (which is in direct contact with the RL of the SAF structure of the bottom shield), and an RL of a sensor stack (which is antiferromagnetically coupled to the PL of the sensor stack), and a FL of the sensor stack which, in a quiescent state is oriented parallel to the ABS of the sensor stack. Specifically, the magnetization map 600 discloses magnetic orientations in an SAF references layer 602 and an SAF pinned layer 604. In this example, the pinning direction 610 of the SAF pinned layer 604 has a component parallel to the plane of ABS. Furthermore, in an area close to the ABS shape anisotropy causes the magnetization 610 to further round up in the direction parallel to ABS. The magnetizations 610 and 612 are essentially antiparallel to each other because of the antiferromagnetic RKKY coupling between the SAF pinned layer 604 and the SAF reference layer 602.

The example implementation of FIG. 6 illustrates magnetization components for a sensor in which the free layer 624 has a shorter stripe than other magnetic layers, however, in alternative implementations, the relation of the size of the free layer and the other layers may be different. FIG. 6 also illustrates the magnetization components in the sensor pinned layer 620 of the sensor stack, the sensor reference layer 622 of the sensor stack, and the free layer 624 of the sensor stack. At the ABS plane, the angle the magnetization direction makes with the ABS is lower than the angle in the region away from the ABS. The direction of magnetization in the sensor pinned layer 620 and the direction of magnetization in the sensor reference layer 622 are in effect substantially antiparallel to each other. The magnetization direction of the free layer 624, which may be set by side shield or permanent magnets, is parallel to the ABS.

In FIG. 6, magnetization of the SAF pinned layer 604 curls to the left at the ABS, however in an alternative implementation (not shown here), the magnetizations at ABS can curl to the right. If pinning direction of the SAF pinned layer 604 is orthogonal to the ABS, the magnetizations can be oriented either way and can even flip between the two states. This flipping of SAF pinned layer magnetization in the ABS region would degrade sensor performance. For better amplitude and resolution, the magnetization of the RL should make obtuse angle, not acute angle with magnetization of the FL. Therefore, in one implementation, the angle between magnetization of the RL of the sensor stack and magnetization of FL is made obtuse by annealing at an angle away from 90 degrees (as shown in FIG. 6) or by carrying out subsequent anneals to obtain the desired canting orientation.

Figure 7:
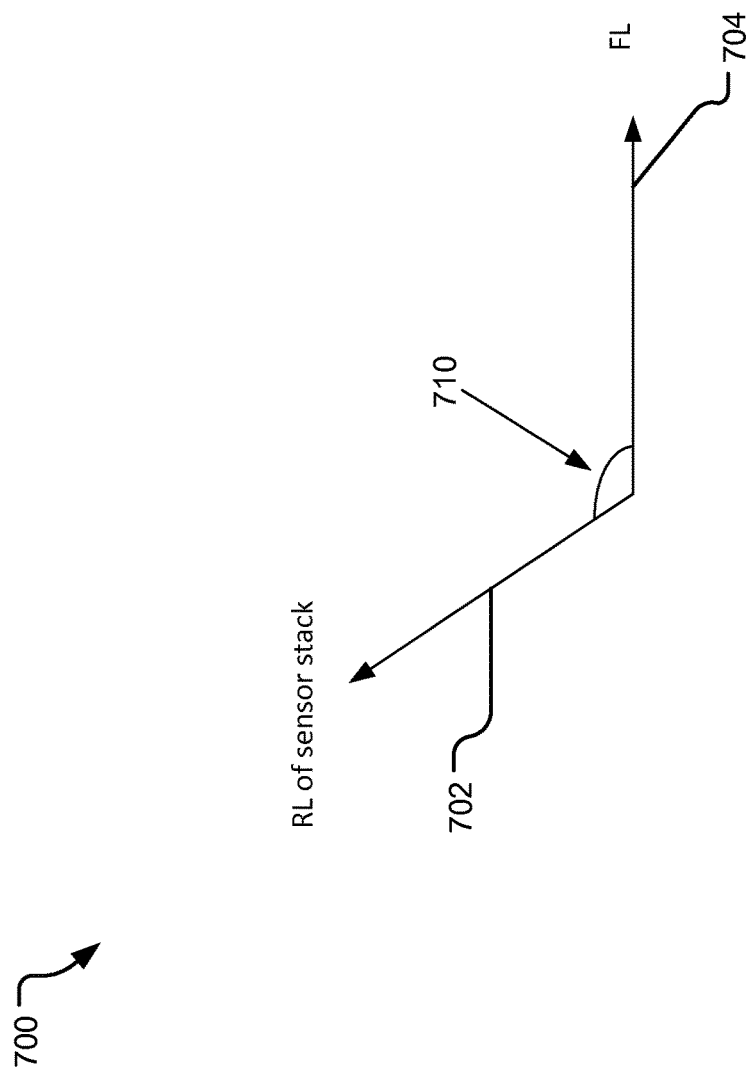
FIG. 7 illustrates magnetic orientations of a reference layer and magnetic orientation of a free layer and their motion in response to external field for an implementation of an MR sensor.

FIG. 7 illustrates preferred magnetic orientations, of a RL of a sensor stack 700 with respect to magnetic orientation of a free layer (FL) of the sensor stack for an implementation of an MR sensor. Specifically, FIG. 7 illustrates that the angle between the magnetic orientation 702 of the RL of the sensor stack and the magnetic orientation 704 of the FL should be obtuse. The magnetic orientation 704 of the FL is determined by the side shields or permanent magnets (PMs) and is parallel to the ABS of a sensor. On the other hand, the magnetic orientation 702 of the RL of the sensor stack may be achieved by carrying out bottom shield anneal at a certain angle from, for example, a direction orthogonal to the ABS of the sensor. The bottom shield anneal determines that pinning field of the layer in the SAF structure in contact with AFM, which in turn affects the magnetizations of the RL of the bottom shield, the magnetization of the PL of the sensor stack, and therefore, the magnetization of the RL of the sensor stack. Specifically, the bottom shield anneal is carried out such that the angle 710 between the magnetic orientation 702 of the RL of the sensor stack and the FL is obtuse.

Figure 8:
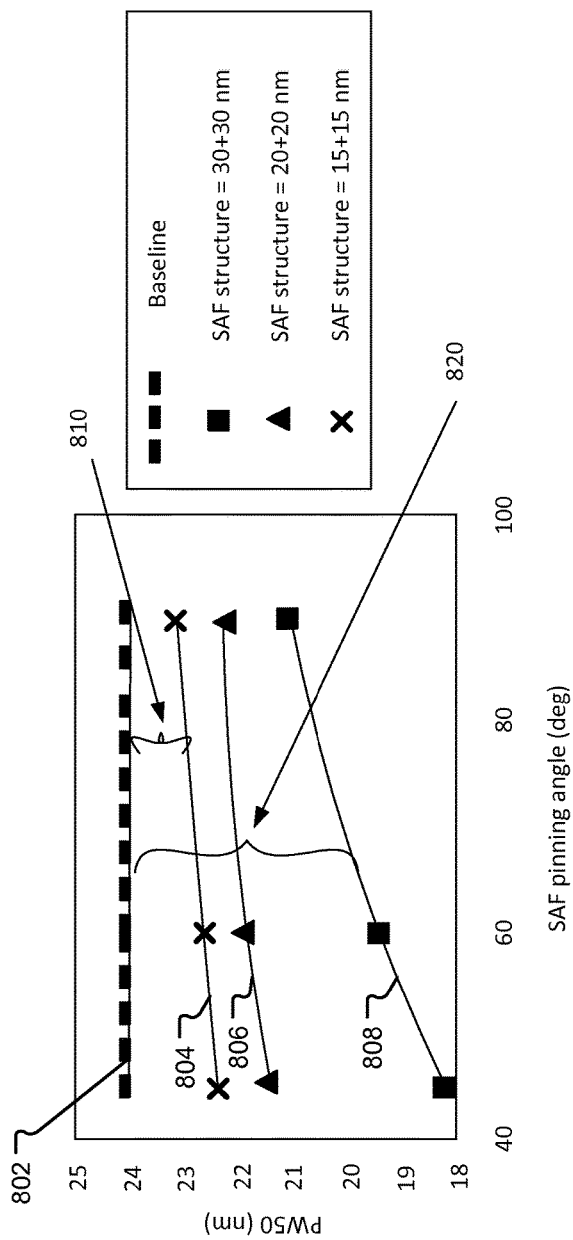
FIG. 8 illustrates graphs of a relationship between PW50 performance of an example MR sensor and a parameter of the MR sensor.

FIG. 8 illustrates a graph 800 of a relationship between PW50 performance of an example MR sensor and thicknesses of magnetic layers of an SAF structure in the bottom shield. Graph 800 is based on modeling for SAF structure layers made of permalloy materials. The graph 800 illustrates dependence of reader resolution on thicknesses of the pinned layer and reference layer in the AFM stabilized bottom shield at different orientation of pinning field in the AFM stabilized bottom shield (e.g., 90 degrees SAF pinning angle meaning pinning field orientation being orthogonal to ABS). The graph 800 illustrates the parameters of the reader that may be tuned to optimize resolution of the reader.

Specifically, each of the lines 804, 806, and 808 represents the PW50 for various SAF pinning angles for given thickness of SAF reference layer and SAF pinned layer, with the thickness of these layers being constant. Line 802 represents the baseline case where the AFM layer incorporated in a sensor stack and not in the bottom shield. For the differences 810, 820, etc., represent decrease in PW50 achieved as a result of providing an SAF structure (including an SAF reference layer and an SAF pinned layer) of given thickness in the bottom shield. Graph 800 illustrates the various relationships between reader resolution and thickness of the PL and RL in the bottom shield where the thickness of the PL and RL are substantially same. As illustrated in FIG. 8, as the thickness of the bottom shield increases, the PW50 gain increases. Furthermore, for each of the lines 804, 806, and 808, the PW50 is lower for any given pinning angle compared to the baseline case, thus showing substantially better resolution in each of the cases. As result, the thickness of the layers in the bottom shield provides an additional parameter to control the PW50 and the resolution of the MR sensor.

FIG. 9 illustrates a graph 900 of an alternative relationship between PW50 performance of an example MR sensor and a parameter of the MR sensor. Specifically, the graph 900 illustrates PW50 as a function of the strength of exchange coupling between the two layers forming the SAF in the bottom shield. Specifically, weaker exchange coupling results in lower PW50. However, as the exchange coupling becomes weaker, the stability provided by the top SAF layer also decreases. Thus, the strength of exchange coupling can be used to control the tradeoff between PW50 and stability. In other words, the graph 900 illustrates a parameter of the reader, the strength of the exchange coupling between the layers in the SAF structure in the bottom shield, which may be tuned to optimize the resolution of the reader.

Figure 10:
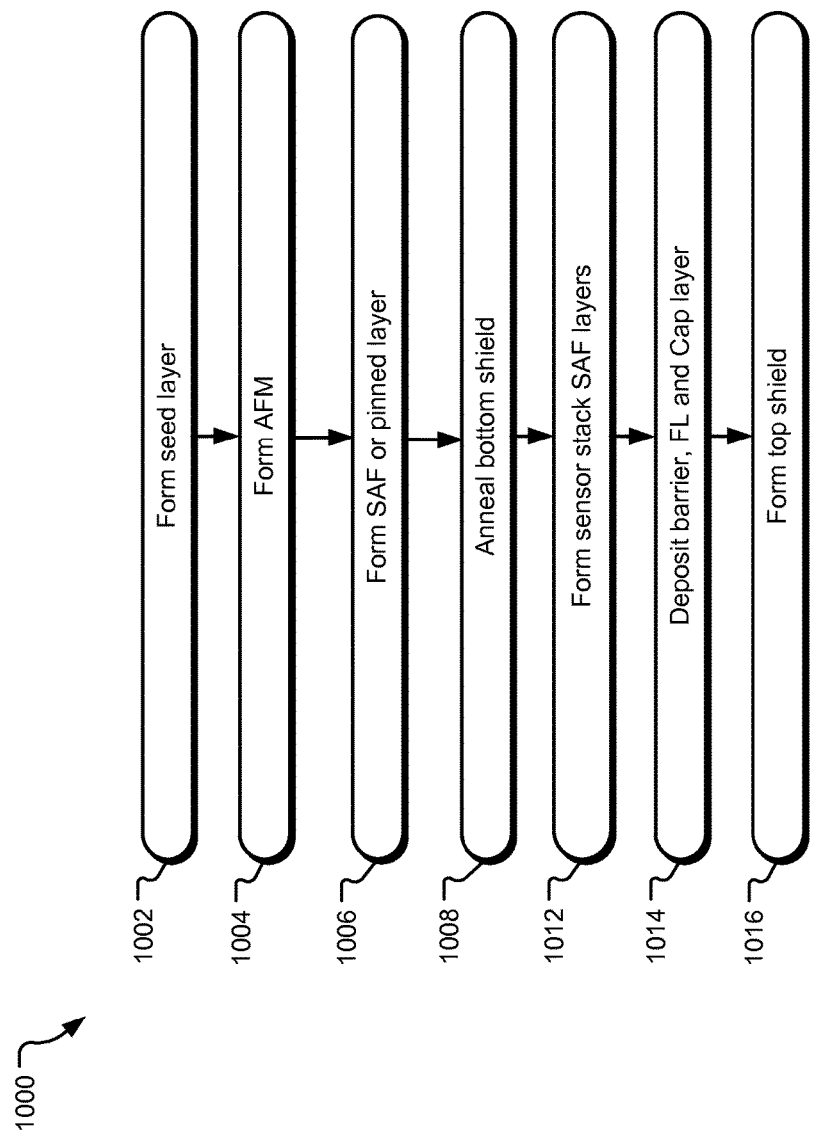
FIG. 10 illustrates example operations for fabrication of an MR sensor disclosed herein.

FIG. 10 illustrates example operations 1000 for fabrication of an MR sensor disclosed herein. Specifically, the operations disclosed in FIG. 10 may be used for fabrication of an MR sensor with AFM stabilized bottom shield including an SAF structure with a top layer proximate a sensor stack. An operation 1002 forms a seed layer, such as a layer of tantalum, and an operation 1004 forms an AFM layer, such as a layer of IrMn, on the seed layer. Subsequently, at an operation 1006, a ferromagnetic pinned layer is formed on the AFM layer or an SAF structure of the bottom shield is formed on the AFM layer. The thickness of the SAF layer can be selected so as to ensure that the gains in the PW50 obtained by including the AFM layer in the bottom shield are balanced against losses in the stability of the MR sensor.

Specifically, increasing the thickness of the SAF layers decreases the stability of the MR sensor. Furthermore, in some implementations of the MR sensor disclosed herein, the thickness of the thin non-magnetic layer that separates the top SAF layer from the pinned layer is also determined so as to control the exchange between the top SAF layer and the PL of the sensor stack.

Subsequently, an operation 1008 anneals the bottom shield to set the magnetic orientation of the ferromagnetic layer (pinned layer of the SAF structure) in the bottom shield. In one implementation, the operation 1008 anneals the bottom shield such that the pinning field direction of the ferromagnetic layer in the bottom shield includes a component that is orthogonal to the ABS of the MR sensor. Alternatively, the operation 1008 anneals the bottom shield to account for any subsequent annealing operation that may affect the magnetic orientation of the AFM layer in the bottom shield. The operations 1012 and 1014 form the sensor stack on the bottom shield. Specifically, operation 1012 forms the sensor stack pinned layer, non-magnetic layer, and a sensor stack reference layer and the operation 1014 forms a barrier layer, the free layer and the cap layer. Subsequently, the operation 1016 forms the top shield layer.

As indicated above, in at least one embodiment that employs an SAF structure in the bottom shield, a pinning field of the PL in contact with the AFM affects the magnetization of the RL of the bottom shield, the magnetization of the PL of the sensor stack, and therefore, the magnetization of the RL of the sensor stack. Specifically, in at least one embodiment, the sensor stack RL is antiferromagnetically coupled to the SAF structure in the bottom shield (referred to hereinafter as SAFB). The AFM is positioned at the bottom of the SAFB and may pin the SAFB in a direction that is substantially perpendicular to the ABS or such that the SAFB includes at least one component that is orthogonal to the ABS. The magnetic orientation of the SAFB RL rotates when influenced by the media field and induces motion in the magnetic orientation of the stack RL in a manner that may lead to PW50 reduction.

As indicated earlier, in order to obtain PW50 reduction, in a quiescent state, a direction of the magnetic orientation of the sensor stack RL in proximity to the ABS needs to be at an obtuse angle with respect to the magnetic orientation of the FL. However, in some embodiments, the magnetostatic coupling between the SAFB PL and the SAFB RL at the ABS, without a proper cross-track bias, may make the magnetization of the SAFB RL scissor to a random cross-track direction with respect to the FL bias direction. This may result in a wide distribution of FL-stack RL angles and therefore substantially different reader-to-reader responses to the media field. Magnetic instability of the SAFB RL by cross-track fields may cause PW50, microtrack (MT)10 (distance between two positions on a track/microtrack of the data storage medium at which the signal strength decreases to 10% of its maximum) and MT50 (distance between two positions on a track/microtrack of the data storage medium at which the signal strength decreases 50% from its maximum) to have multiple modes and large distributions.

Accordingly, to enhance reader stability, embodiments described below in connection with FIGS. 11A-16D apply a suitable cross-track bias to the SAFB RL.

Figure 11A:
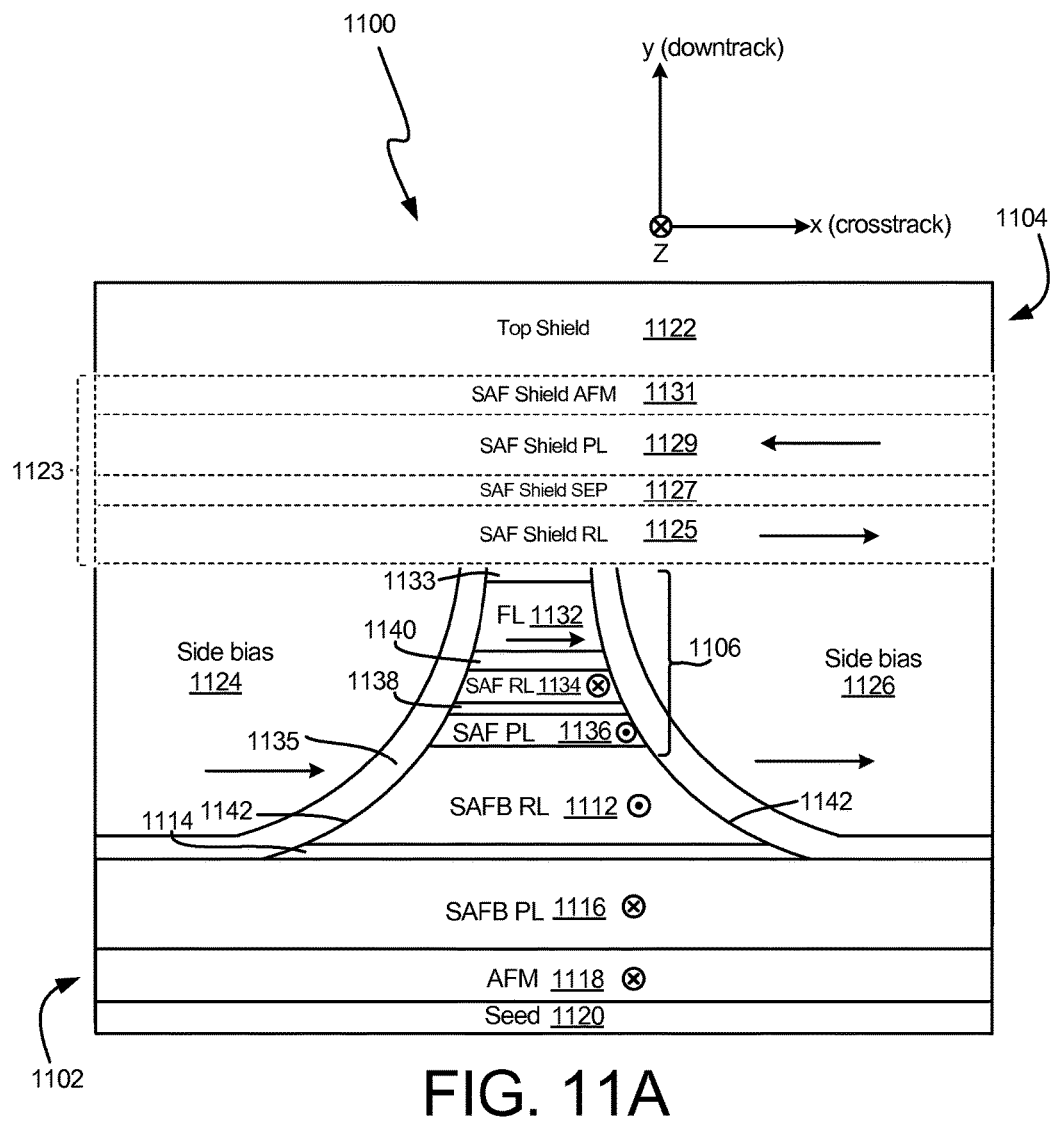
FIGS. 11A, 11B, 12, 13 and 14 illustrate different embodiments of MR sensors.

FIG. 11A illustrates an air bearing surface view of an embodiment of an MR sensor 1100 in which an SAFB RL is biased by a side shield. MR sensor 1100 includes a bottom shield 1102 and a top shield 1104 on two opposite sides (along down-track direction) of a sensor stack 1106. The bottom shield 1102 includes an SAF structure including a top layer (SAFB RL) 1112 in proximity to the sensor stack 1106, a thin non-magnetic layer 1114, a pinned layer (SAFB PL) 1116, an AFM layer 1118, and a seed layer 1120. In one implementation, SAFB PL 1116 is stabilized using the AFM layer 1118. The orientation of pinning of the layer 1116 is substantially orthogonal (in the z direction) to the ABS of the MR sensor 1100. The SAFB PL 1116 and the SAFB RL 1112 are antiferromagnetically coupled through a non-magnetic layer 1114 (such as ruthenium) via RKKY exchange interaction.

The top shield 1104 may comprise a top shield layer 1122, an optional SAF top (SAFT) shielding structure 1123, and side shield layers 1124 and 1126. The side shields 1124 and 1126 are located on the two sides of the sensor stack 1106 in the cross-track direction and they may be used to bias the magnetic orientation of a free layer of the sensor stack 1106. As can be seen in FIG. 11A, a width of SAFB RL 1112 (in the x (i.e., cross-track) direction) is substantially less than a width of SAFB PL 1116. This enables side shields 1124 and 1126 to also be located on the two sides of the SAFB RL 1112 in the cross-track direction, and therefore side shields 1124 and 1126 may also be used to apply a suitable cross-track bias to SAFB RL 1112.

In the embodiment shown in FIG. 11A, optional SAFT 1123 includes a SAFT reference layer (RL) 1125, a thin SAFT separation layer 1127, which may comprise a metal such as Ru in some embodiments, a SAFT pinned layer (PL) 1129 and a SAFT AFM layer 1131. Because, in some embodiments, sensor 1100 utilizes soft magnetic side shields 1124 and 1126, SAFT RL 1125 needs to have a relatively fixed magnetization to assist in stabilizing the magnetizations of side shields 1124 and 1126. Thus, SAFT AFM layer 1131 needs to pin the magnetization of SAF PL 1129 substantially parallel to the bearing surface, which results in the relatively fixed magnetization of SAFT RL 1125 due to antiferromagnetic coupling across SAFT separation layer 1127 and thus in stabilizing the magnetizations of the side shields 1124 and 1126 substantially parallel to the bearing surface as well. SAFT RL 1125 and SAFT PL 1129 may be formed of a soft magnetic material (for example, an alloy comprising Ni and Fe). It should be noted that, instead of employing SAFT shielding structure 1123, side shields 1124 and 1126 may be stabilized by shape anisotropy, by employing hard magnetic layers adjacent to the soft magnetic layers within side shield 1124 and 1126, or by any other suitable technique.

An implementation of the sensor stack 1106 includes a pinned layer 1136, a reference layer 1134, a cap layer 1133, free layer (FL) 1132, and a spacer layer (for example, a barrier layer such as an MgO barrier layer for TMR, or a metallic layer such as a Cu layer for GMR) 1140. The pinned layer (PL) 1136 and the reference layer (RL) 1134 are separated from each other by a metallic layer 1138, made of, e.g., ruthenium (Ru). In the illustrated implementation of the MR sensor 1100, the PL 1136 is pinned by the AFM layer 1118 of the bottom shield 1102. For example, the pinning orientation of the PL 1136 is substantially orthogonal to the air bearing surface of the MR sensor 1100. Thus, the pinning of each of the SAFB PL 1116 and the stack PL 1136 is substantially orthogonal to the air bearing surface of the MR sensor 1100. Also, the stack RL 1134 is RKKY coupled to SAFB RL 1112 and these layers have magnetic orientations substantially orthogonal to the air bearing surface. The sensor stack 1106 and SAFB RL 1112 are separated and electrically isolated from the side shields 1124 and 1126 by an isolation layer 1135 including, for example, insulating materials. As will be described further below, the sensor stack 1106 and SAFB RL 1112 may be formed in a in a single milling step so that a continuous substantially curved profile 1142 is formed on each side of both the sensor stack 1106 and the SAFB RL 1112.

Figure 11B:
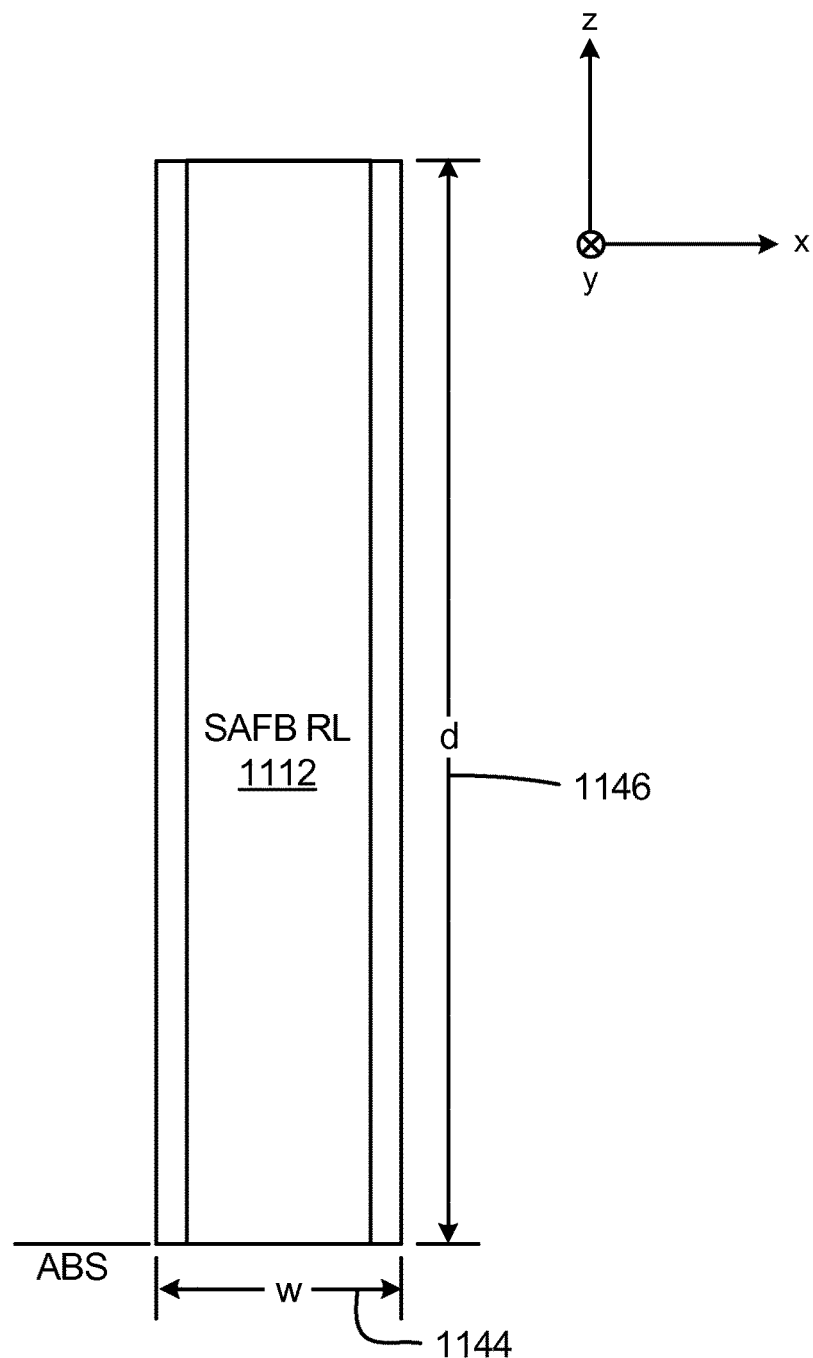

Referring now to FIG. 11B, which is a top view of the SAFB RL 1112 of MR sensor 1100 of FIG. 11A, it can be seen that, in addition to layer 1112 having the relatively narrow width (shown in FIG. 11A), SAFB RL 1112 has an elongated shape perpendicular to the bearing surface. Specifically, a width, w (denoted by reference numeral 1144), of SAFB RL 1112 along the x direction is substantially narrower than a depth, d (denoted by reference numeral 1146), of SAFB RL 1112 along the z direction. In a particular embodiment, the width, w, of SAFB RL 1112 is at least twice as narrow as the depth, d, of SAFB RL 1112.

In MR sensor 1100 described above in connection with FIGS. 11A and 11B, a bias field from the side shield(s) on the side(s) of SAFB RL 1112 and/or the shape anisotropy of a narrow, elongated SAFB RL 1112 regulate the magnetization direction of the SAFB RL 1112 and substantially remove degeneracy and randomness of SAFB RL directions. As indicated above, the magnetization direction of the stack RL 1134, which is RKKY coupled to the SAFB RL 1112, is established to form a certain obtuse angle with respect to the FL 1132 bias direction. Modeling confirms that, in the narrow SAFB RL design (for example, present in an MR sensor such as 1100), the cross-track switching field of the SAFB RL is substantially larger in comparison with certain MR sensor designs that employ a substantially wide SAFB RL. Further, modeling confirms that MR sensors with the narrow SAFB RL design are stable to the cross-track field until the field is increased to a level that is high enough to switch a magnetic orientation of the side shield(s). This indicates significant RL stability improvement relative to certain MR sensor embodiments that employ a substantially wide SAFB RL. Modeling also confirms that an obtuse angle is formed between the stack FL and the stack RL in the MR sensors with the narrow SAFB RL design. Accordingly, this design may help eliminate the multiple PW50 modes and help reduce the large distribution of PW50 observed in certain MR sensors that employ a substantially wide SAFB RL.

Also, as indicated above, in the MR sensor design shown in FIG. 11A, a side shield is placed on either side of SAFB RL 1112, which is unlike certain designs that have an SAFB RL that is elongated along the cross-track direction, parallel to ABS. Biasing by the side shields and the cross-track field stability improvement may help improve MT performance and resolve the MT10 and/or MT50 inflation observed in certain MR sensor designs that employ a substantially wide SAFB RL.

Figure 12:
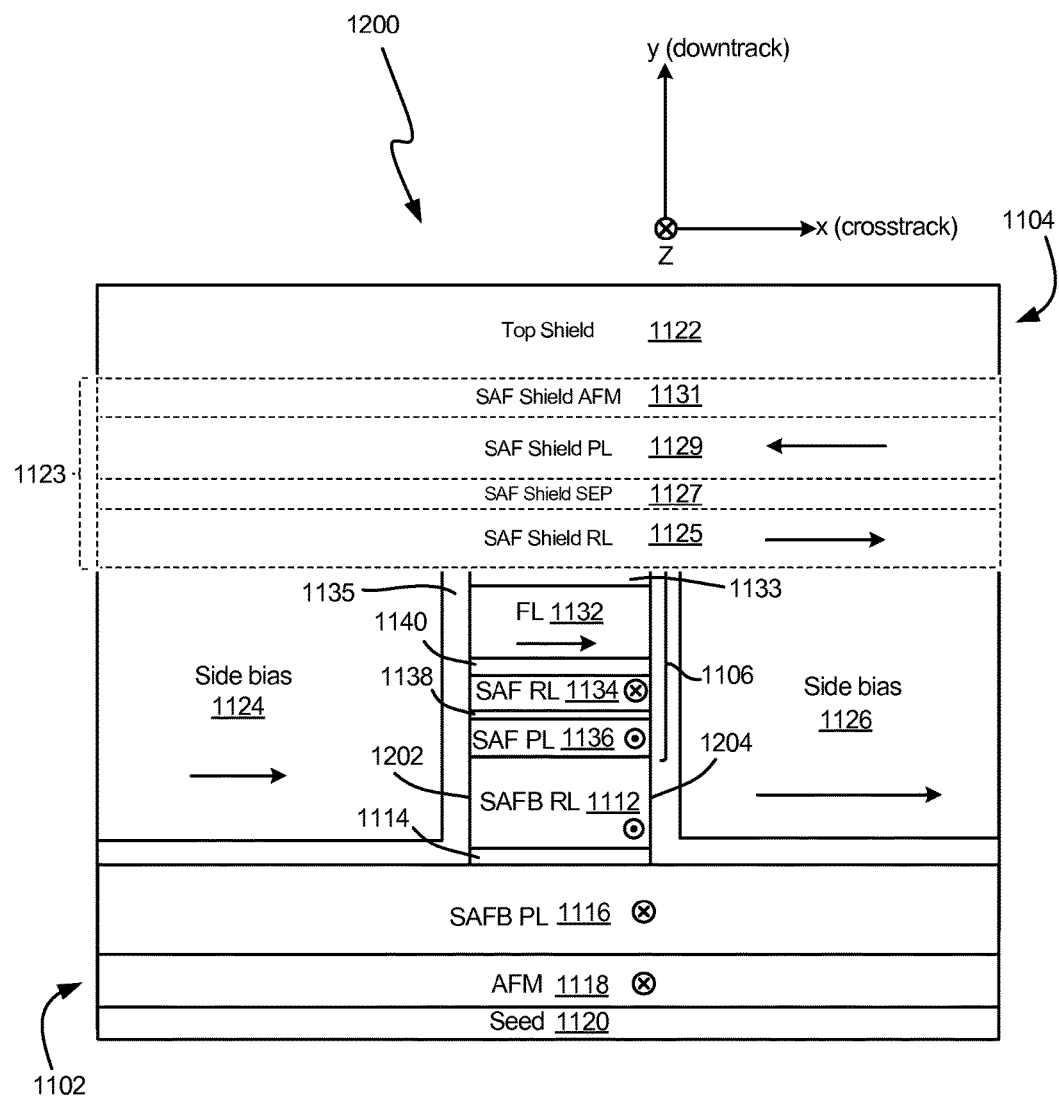

FIG. 12 illustrates a bearing surface view of another embodiment of an MR sensor 1200 in which an SAFB RL is biased by a side shield. Individual elements of MR sensor 1200 are substantially similar to the element of MR sensor 1100 of FIG. 11, and therefore the same reference numerals are used to denote the similar elements. Further, in the interest of brevity, a description of the similar elements is not repeated. Unlike MR sensor 1100 of FIG. 11A, which is formed such that a continuous substantially curved profile 1142 is on each side of both the sensor stack 1106 and the SAFB RL 1112, MR sensor 1200 includes sides 1202 and 1204 that are substantially at 90 degree angles to a top surface of SAFB PL 1116 at the bearing surface as can be seen in FIG. 12. In MR sensor 1200, a width of SAFB RL at the air bearing surface corresponds to a width of the sensor stack 1106 at the air bearing surface. In MR sensor 1200, a width of SAFB PL 1116 is substantially greater than a width of SAFB RL 1112, which enables side shields 1124 and 1126 to be located on the two sides of the SAFB RL 1112 in the cross-track direction. Also, although not shown in FIG. 12, SAFB RL 1112 has an elongated shape perpendicular to the air bearing surface.

Figure 13:
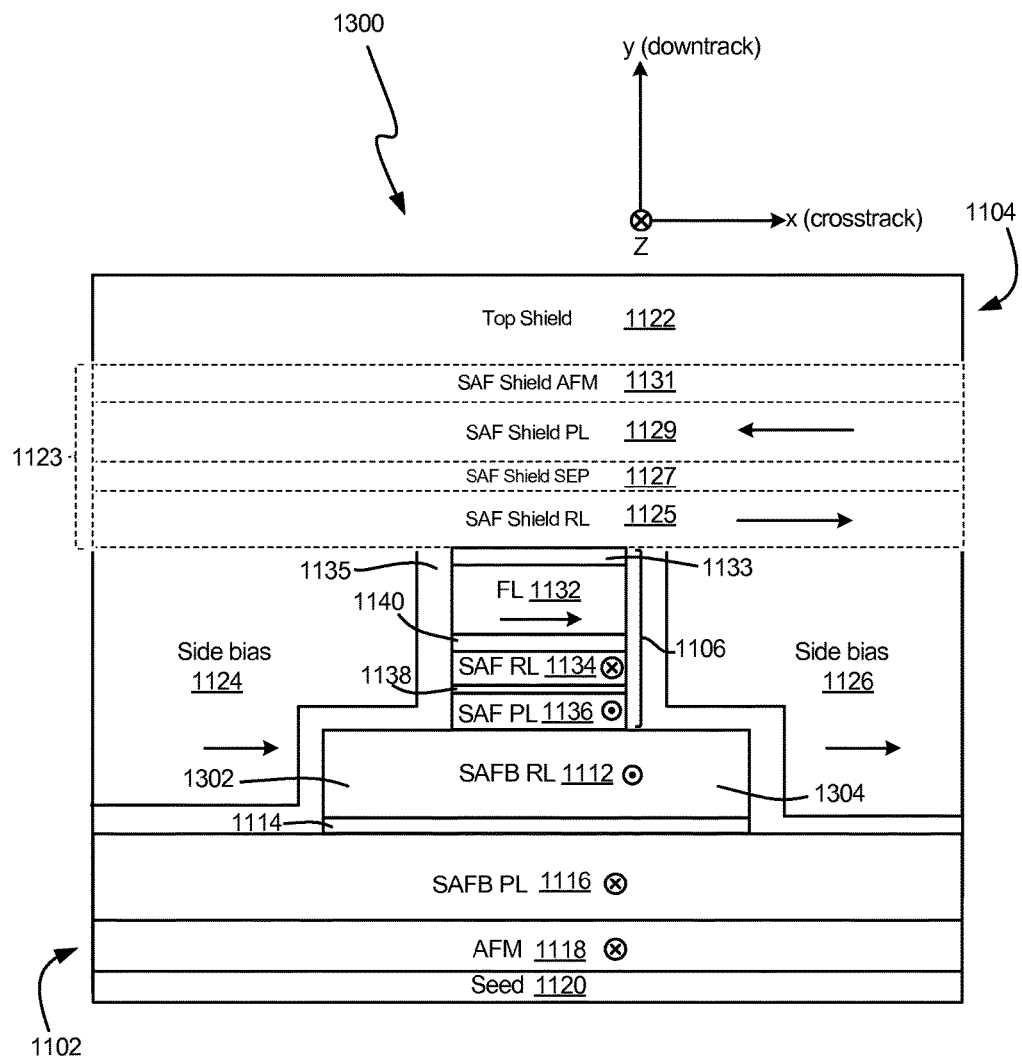

FIG. 13 illustrates an air bearing surface view of yet another embodiment of an MR sensor 1300 in which an SAFB RL is biased by a side shield. In MR sensor 1300, SAFB RL 1112 is patterned separately from the sensor stack 1106 to form steps 1302 and 1304 between SAFB PL 1116 and sensor stack 1106. In other respects, SAFB RL 1112 and the remaining layers of sensor 1300 are substantially similar to the layers of sensor 1100 (of FIG. 11A) and sensor 1200 (of FIG. 12).

Figure 14:
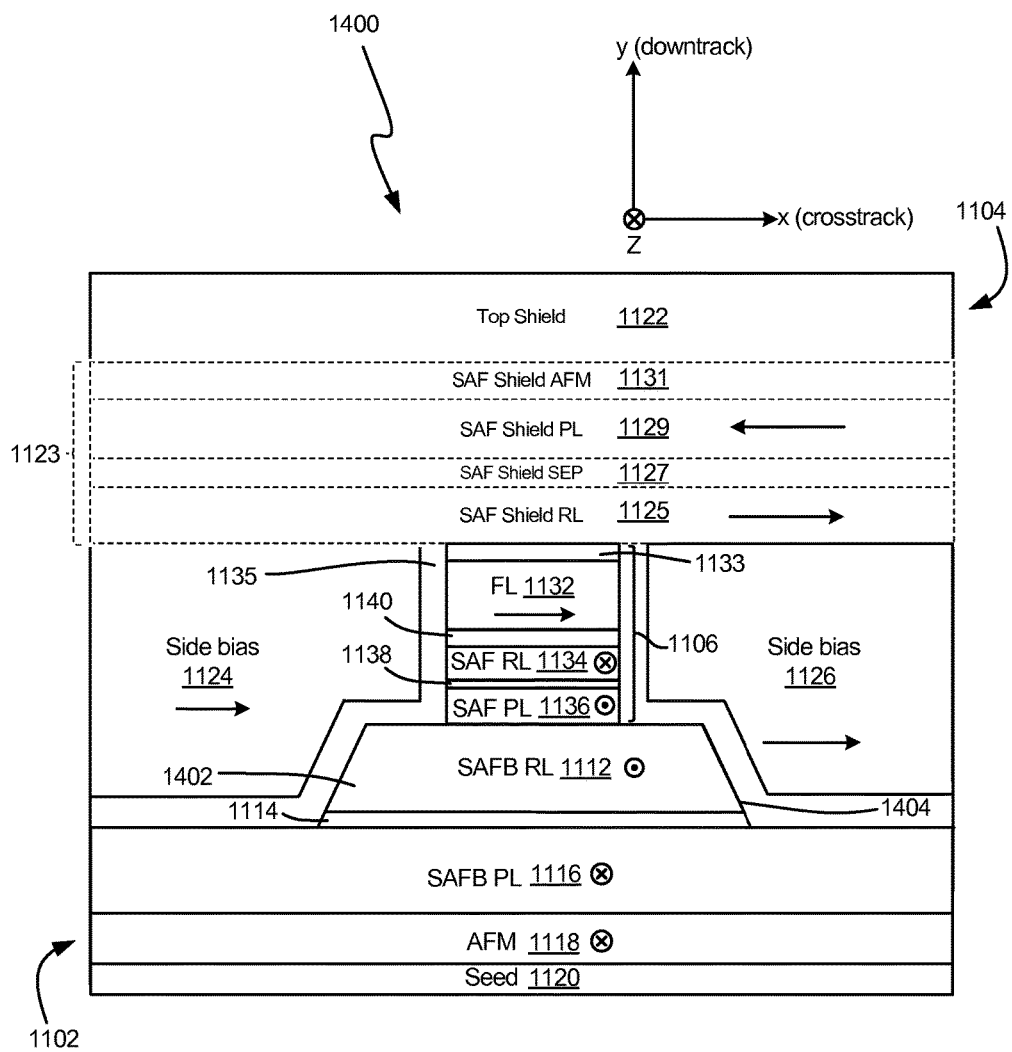

FIG. 14 illustrates an air bearing surface view of still another embodiment of an MR sensor 1400 in which an SAFB RL is biased by a side shield. In MR sensor 1400, SAFB RL 1112 has a trapezoidal shape at the bearing surface. Lateral sides of SAFB RL 1112 are labeled 1402 and 1404, respectively, in FIG. 14. In other respects, SAFB RL 1112 and the remaining layers of sensor 1400 are substantially similar to the layers of sensor 1100 (of FIG. 11A), sensor 1200 (of FIG. 12) and sensor 1300 (of FIG. 13).

It should be noted that, in the above-described embodiments, SAFB PL 1116 and SAFB RL 1112 may be comprised of an NiFe alloy, a CoFe alloy, or multilayers of those alloys. The thin non-magnetic layer 1114 (i.e., that SAFB spacer) may be made of Ru, Cr, or Ir. Other suitable materials may also be used in alternate embodiments.

Figure 15A:
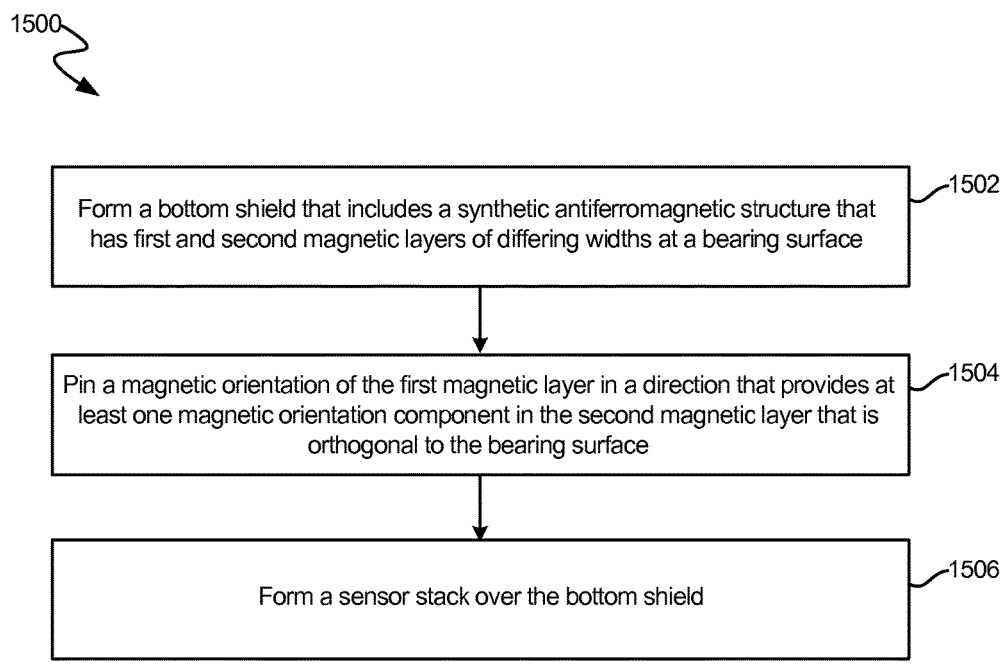
FIG. 15A is a flow diagram of a method embodiment.

FIG. 15A is a simplified flow diagram 1500 of a method of forming an MR sensor. The method includes, at step 1502, forming a bottom shield that includes an SAF structure having first and second magnetic layers of differing widths at a bearing surface. In one embodiment, step 1502 may include forming the first magnetic layer having a first width at the bearing surface, forming a coupling layer over the first magnetic layer, and forming a second magnetic layer over the coupling layer. The second magnetic layer is formed with a second width at the bearing surface that is less than the first width. At step 1504, a magnetic orientation of the first magnetic layer is pinned in a direction that provides at least one magnetic orientation component in the second magnetic layer that is substantially orthogonal to the bearing surface. At step 1506, a sensor stack is formed over the bottom shield. Forming the sensor stack may include forming a free layer with a magnetic orientation that is substantially parallel to the bearing surface. The method may further include forming at least one side shield the biases both the free layer and the second magnetic layer. In should be noted that the second magnetic layer may be formed to have an elongated shape in a direction perpendicular to the bearing surface.

Figure 15B:
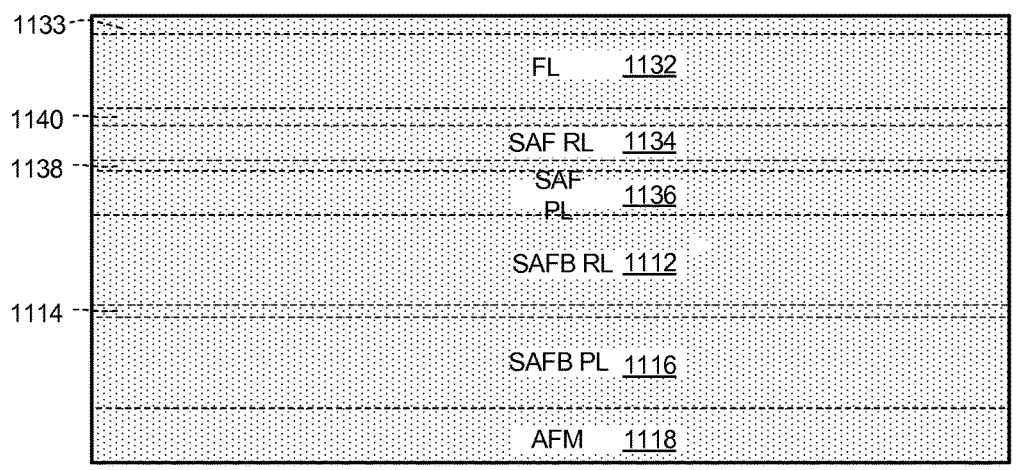
FIGS. 15B and 15C are diagrammatic illustrations of MR sensor layers before and after a milling process, respectively.
Figure 15C:
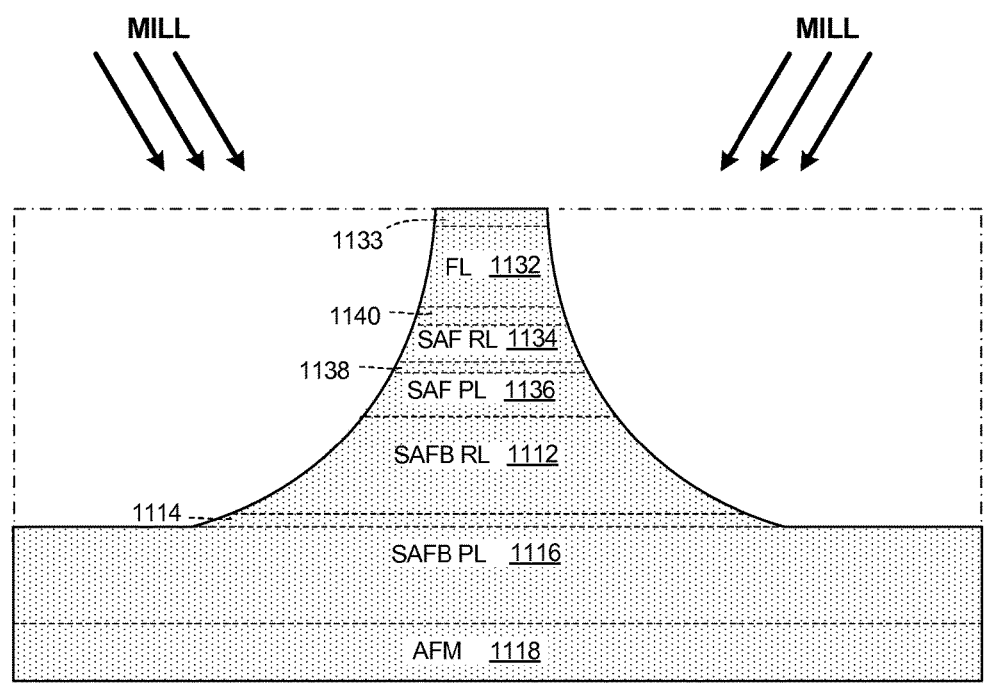

In one embodiment, forming the above-described bottom shield and sensor stack may be carried out by depositing the layers of the bottom shield and the sensor to form a single stack as shown in FIG. 15B. Thereafter, oblique milling may be carried out on the single stack shown in FIG. 15C in a single milling operation to form an MR sensor such as 1100 (of FIG. 11A) that includes a continuous substantially curved profile on each side of both the sensor stack and the second magnetic layer (i.e., SAFB RL 1112).

As indicated above, in another embodiment (for example, MR sensor 1200 shown in FIG. 12), the sensor stack 1106 and SAFB RL 1112 are formed to have a substantially same width and to include sides that are substantially at 90 degree angles to a top surface of SAFB PL 1116 at the air bearing surface. Further, as indicated above, in yet another embodiment (for example, MR sensor 1300 shown in FIG. 13), SAFB RL 1112 is patterned separately from the sensor stack 1106 to form steps 1302 and 1304 between SAFB PL 1116 and sensor stack 1106 and thereby provide a stepped profile. In general, any suitable profile (i.e., the above-described profiles or any other suitable profile) may be used in different applications.

Figure 16A:
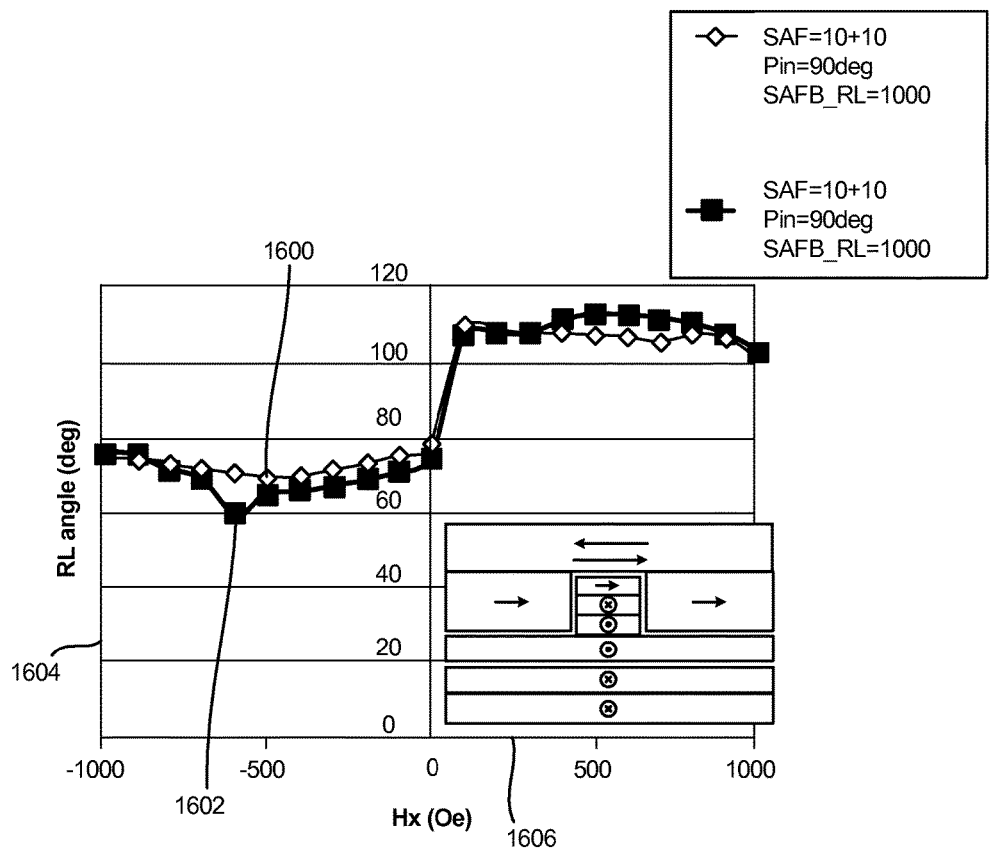
FIGS. 16A, 16B, 16C and 16D illustrate cross-track transfer curves for different sensors.

FIGS. 16A, 16B, 16C and 16D show graphs that collectively illustrate a comparison of cross-track transfer curves for different sensors. In FIGS. 16A, 16B, 16C and 16D, a vertical axis 1604 represents a stack RL angle beneath the FL in degrees, and a horizontal axis 1606 represents a cross-track field (Hx in Oersted (Oe)) applied to the sensor. FIG. 16A illustrates cross-track transfer curves 1600 and 1602 for a baseline sensor design, which is a sensor with a substantially wide SAFB RL (1000 nm wide) that is not biased by any side shields. Further, in the baseline sensor, each of the SAFB RL and the SAFB PL is 10 nm thick, and the magnetic orientation of the SAFB RL and the SAFB PL is orthogonal to the bearing surface. Curve 1600 represents values obtained when the cross-track field is applied in a positive direction. Curve 1602 represents values obtained when the cross-track field direction is reversed.

Figure 16B:
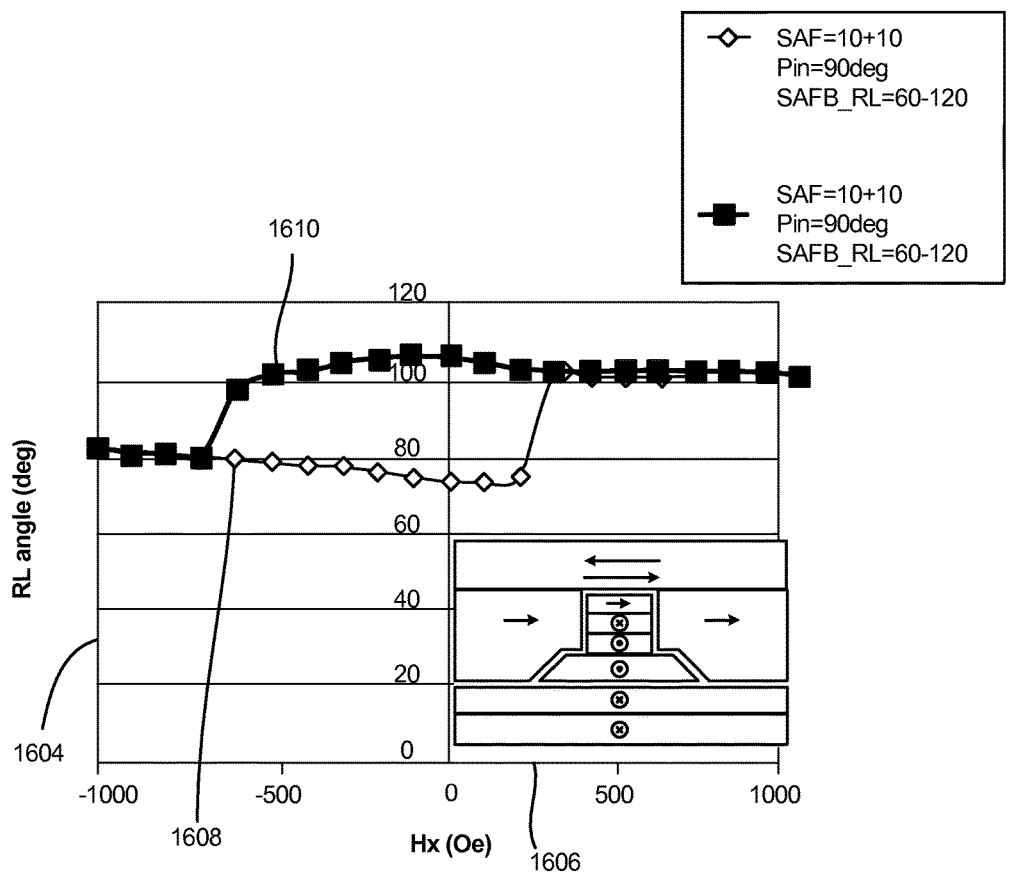
Figure 16C:
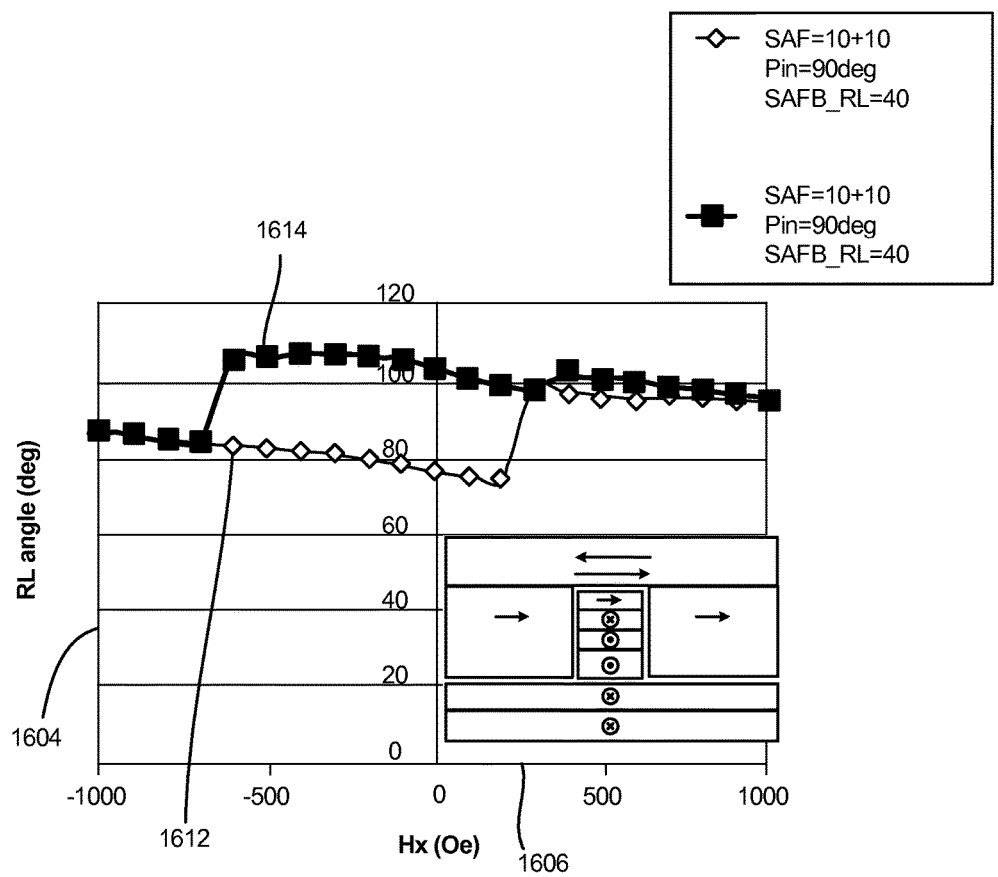

FIG. 16B illustrates cross-track transfer curves 1608 and 1610 for a sensor design that includes a narrow SAFB RL that is biased by side shields. The SAFB RL is trapezoidal in shape, with the upper horizontal parallel side being 60 nm wide and the lower horizontal parallel side being 120 nm wide. Further, in the sensor, each of the SAFB RL and the SAFB PL is 10 nm thick, and the magnetic orientation of the SAFB RL and the SAFB PL is orthogonal to the bearing surface. Curve 1608 represents values obtained when the cross track field is increased in a positive direction. Curve 1610 represents values obtained when the cross-track field direction is reversed. FIG. 16C illustrates cross-track transfer curves 1612 and 1614 for a sensor design that includes a narrow rectangular SAFB RL (40 nm wide) that is biased by side shields. The narrow rectangular SAFB RL has a width that is equal to the width of the sensor stack. Further, in the sensor, each of the SAFB RL and the SAFB PL is 10 nm thick, and the magnetic orientation of the SAFB RL and the SAFB PL is orthogonal to the bearing surface. Curve 1612 represents values obtained when the cross track field is applied in a positive direction. Curve 1614 represents values obtained when the cross-track field direction is reversed. A comparison of the curves/plots of FIGS. 16A, 16B and 16C shows that both narrow SAFB RL designs (FIGS. 16B and 16C) behave qualitatively differently from the baseline design.

Figure 16D:
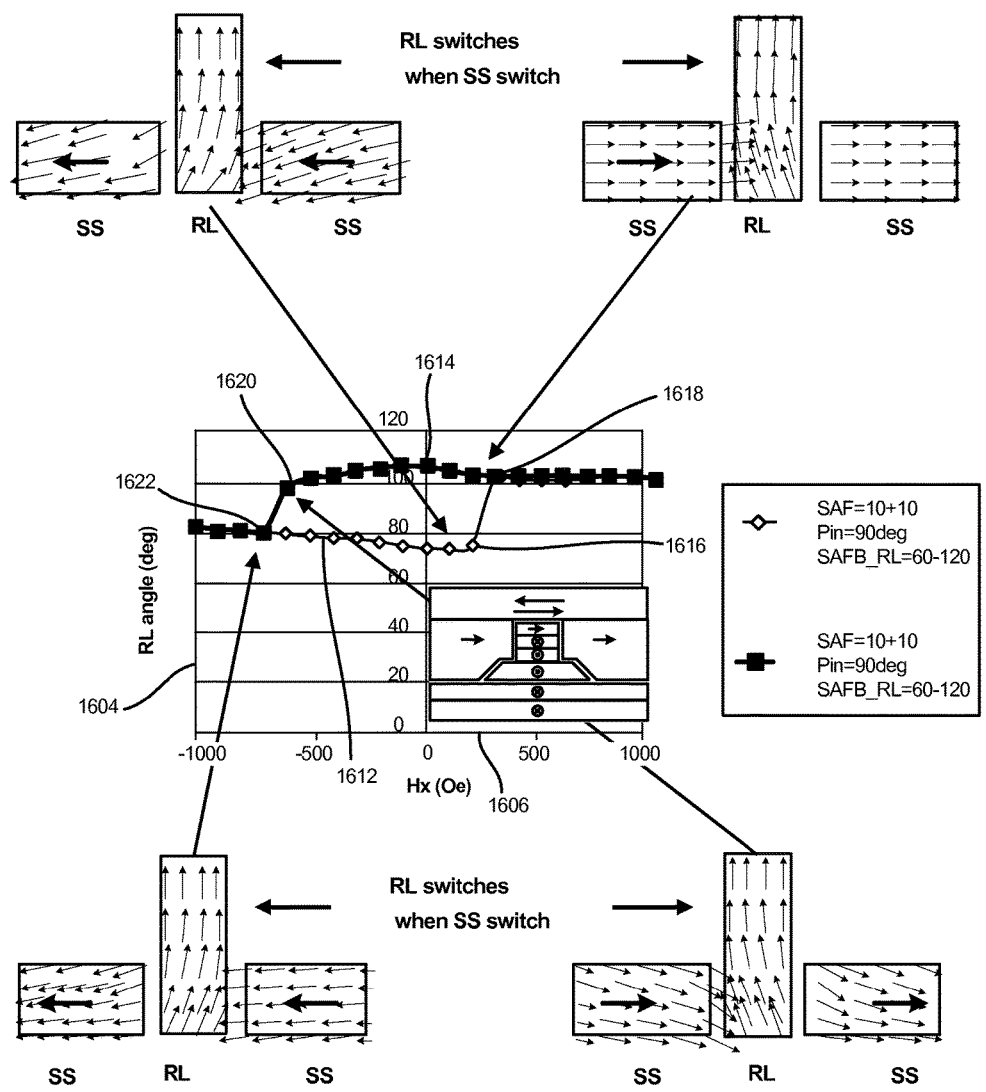

FIG. 16D shows the curves/plots of FIG. 16B and also illustrates switches in magnetization directions of the stack RL at points 1616, 1618, 1620 and 1622 on curves 1608 and 1610. In a sensor that employs a narrow SAFB RL that is biased by side shields (SS), the magnetization direction of the stack RL (and the SAFB RL) is controlled by the magnetization direction of the SS. From FIG. 16D, it can be seen that, as long as the magnetization direction of the SS does not switch, the magnetization direction of the stack RL remains stable in the presence of an external cross-track field. This is an improvement over the baseline sensor response to variations in an external cross track field shown in FIG. 16A. In the baseline sensor design, the magnetization direction of the stack RL may switch without any switch in the magnetization direction of the SS, which may be undesirable. Thus, a sensor that employs a narrow SAFB RL that is biased by the SS is relatively stable.

The above specification, examples, and data provide a complete description of the structure and use of exemplary embodiments. Since many embodiments can be made without departing from the spirit and scope of the disclosure, the embodiments reside in the claims hereinafter appended. Furthermore, structural features of the different embodiments may be combined in yet another embodiment without departing from the recited claims.

What is claimed is:

1. A reader comprising:
   a bearing surface;
   a sensor stack having a free layer and a first synthetic antiferromagnetic (SAF) structure below the free layer; and
   a bottom shield below the sensor stack, the bottom shield comprising a second SAF structure magnetically coupled to the first SAF structure, the second SAF structure including a first magnetic layer having a first width at the bearing surface and a second magnetic layer having a second width at the bearing surface that is less than the first width,
   wherein the second magnetic layer comprises a magnetic orientation having at least a component that is substantially orthogonal to the bearing surface.

2. The reader of claim 1 and wherein the free layer has a magnetic orientation that is substantially parallel to the bearing surface of the reader.

3. The reader of claim 2 and further comprising at least one side shield configured to bias the free layer.

4. The reader of claim 3 and wherein the at least one side shield is further configured to bias the second magnetic layer of the second SAF structure.

5. The reader of claim 1 and wherein the second width of the second magnetic layer of the second SAF structure corresponds to a width of the sensor stack at the bearing surface.

6. The reader of claim 1 and wherein the second width of the second magnetic layer of the second SAF structure is greater than a width of the sensor stack at the bearing surface.

7. The reader of claim 6 and wherein the second magnetic layer is substantially rectangular in shape and forms at least one step between the first magnetic layer and the sensor stack.

8. The reader of claim 6 and wherein the second magnetic layer is substantially trapezoidal in shape.

9. The apparatus of claim 1 and wherein the first SAF structure is in contact with the second SAF structure.

10. The reader of claim 1 and wherein the second magnetic layer comprises a substantially elongated shape along an axis that is perpendicular to the bearing surface.

11. An apparatus comprising:
    a bearing surface;
    a sensor stack comprising a free layer with a magnetic orientation in a first direction and a first SAF structure below the free layer; and
    a bottom shield below the sensor stack, the bottom shield comprising a second SAF structure magnetically coupled to the first SAF structure, the second SAF structure including a first magnetic layer having a first width at the bearing surface and a second magnetic layer having a second width at the bearing surface that is less than the first width, wherein the second magnetic layer comprises a magnetic orientation having at least a component that is substantially orthogonal to the bearing surface; and
    at least one side shield that biases both the free layer and the second magnetic layer of the second SAF structure.

12. The apparatus of claim 11 and wherein the second magnetic layer comprises a magnetic orientation in a second direction that is different from the first direction of the magnetic orientation of the free layer.

13. The apparatus of claim 11 and wherein the second magnetic layer comprises a substantially elongated shape along an axis that is perpendicular to the bearing surface.

14. The apparatus of claim 11 and further comprising a top shield having a SAF structure.

15. The apparatus of claim 11 and wherein the at least one side shield comprises at least one of a soft magnetic material or a permanent magnet.

* * * * *